United States Patent
Luehrig et al.

(10) Patent No.: US 8,144,840 B2
(45) Date of Patent: *Mar. 27, 2012

(54) METHOD AND SYSTEM FOR FACILITATING MEDIATED COMMUNICATION

(75) Inventors: Uwe Luehrig, Hamburg (DE); Stuart Evans, RushBury (GB)

(73) Assignee: Openwave Systems Inc., Redwood City, CA (US)

(*) Notice: Subject to any disclaimer, the term of this patent is extended or adjusted under 35 U.S.C. 154(b) by 1190 days.

This patent is subject to a terminal disclaimer.

(21) Appl. No.: 11/675,512

(22) Filed: Feb. 15, 2007

(65) Prior Publication Data

US 2007/0198253 A1  Aug. 23, 2007

Related U.S. Application Data

(63) Continuation of application No. 10/096,261, filed on Mar. 12, 2002, now Pat. No. 7,197,120, which is a continuation-in-part of application No. 09/829,515, filed on Apr. 9, 2001, now Pat. No. 6,950,503.

(60) Provisional application No. 60/258,144, filed on Dec. 22, 2000, provisional application No. 60/344,299, filed on Dec. 28, 2001.

(51) Int. Cl.
*H04M 11/06* (2006.01)
*H04L 12/66* (2006.01)
*H04J 3/16* (2006.01)
*G10L 19/12* (2006.01)
*G06F 15/16* (2006.01)

(52) U.S. Cl. ............ 379/88.14; 370/261; 370/352; 370/356; 370/409; 379/52; 379/88.18; 379/88.23; 379/127.01; 379/215.01; 455/417; 704/221; 704/258; 704/260; 704/270.1; 709/201; 709/203; 709/206; 709/219; 709/227; 705/14.56; 719/328

(58) Field of Classification Search ............ 370/352, 370/261, 356, 409; 379/88.13, 88.14, 88.17, 379/7.01, 215.01, 52, 88.18, 88.23, 80.01, 379/127.01, 201.01; 704/221, 258, 260, 704/270.1; 455/417; 705/14.56; 709/201, 709/203, 206, 219, 225, 227; 719/238

See application file for complete search history.

(56) References Cited

U.S. PATENT DOCUMENTS

| 5,210,789 | A | * | 5/1993 | Jeffus et al. ............ 379/127.01 |
| 5,327,486 | A | | 7/1994 | Wolff et al. |
| 5,434,908 | A | | 7/1995 | Klein |
| 5,555,376 | A | | 9/1996 | Theimer et al. |
| 5,557,659 | A | * | 9/1996 | Hyde-Thomson ......... 379/88.13 |
| 5,608,786 | A | * | 3/1997 | Gordon ........................ 370/352 |

(Continued)

OTHER PUBLICATIONS

PCT International Search Report PCT/US02/10918, Mar. 14, 2003.

(Continued)

*Primary Examiner* — Gerald Gauthier

(57) ABSTRACT

One embodiment of the disclosures made herein is a method for facilitating mediated communication. In such an embodiment of the disclosures made herein, a voice-based communication request transmitted from a first communication device is received by a mediation system. The voice based communication request is requesting voice-based communication between the first communication device and a second communication device. In response to receiving the request for voice-based communication, a capability of the first communication device for communicating via a prescribed text messaging protocol is determined. Facilitating presentation of a text messaging follow-through action at the second communication device is performed in response to determining that the first communication device is capable of communicating via the prescribed text messaging protocol.

19 Claims, 23 Drawing Sheets

U.S. PATENT DOCUMENTS

| | | | |
|---|---|---|---|
| 5,724,410 A * | 3/1998 | Parvulescu et al. | 379/88.18 |
| 5,758,280 A | 5/1998 | Kimura | |
| 5,870,454 A | 2/1999 | Dahlen | |
| 5,872,841 A | 2/1999 | King et al. | |
| 5,884,262 A * | 3/1999 | Wise et al. | 704/270.1 |
| 5,930,700 A | 7/1999 | Pepper et al. | |
| 5,933,778 A | 8/1999 | Buhrmann et al. | |
| 5,978,770 A | 11/1999 | Waytena et al. | |
| 5,995,597 A | 11/1999 | Woltz et al. | |
| 6,018,671 A | 1/2000 | Bremer | 455/567 |
| 6,018,710 A * | 1/2000 | Wynblatt et al. | 704/260 |
| 6,021,181 A * | 2/2000 | Miner et al. | 379/88.23 |
| 6,061,718 A * | 5/2000 | Nelson | 709/206 |
| 6,104,788 A | 8/2000 | Shaffer et al. | |
| 6,219,413 B1 * | 4/2001 | Burg | 379/215.01 |
| 6,275,690 B1 | 8/2001 | Higuchi et al. | 455/412.2 |
| 6,317,485 B1 | 11/2001 | Homan et al. | |
| 6,324,265 B1 | 11/2001 | Christie, IV et al. | |
| 6,333,973 B1 | 12/2001 | Smith et al. | |
| 6,337,858 B1 * | 1/2002 | Petty et al. | 370/356 |
| 6,351,771 B1 | 2/2002 | Craddock et al. | |
| 6,360,205 B1 | 3/2002 | Iyengar et al. | |
| 6,366,651 B1 * | 4/2002 | Griffith et al. | 379/88.14 |
| 6,373,817 B1 | 4/2002 | Kung et al. | |
| 6,374,246 B1 | 4/2002 | Matsuo | |
| 6,385,305 B1 | 5/2002 | Gerszberg et al. | |
| 6,389,455 B1 | 5/2002 | Fuisz | |
| 6,400,813 B1 | 6/2002 | Birnhak | |
| 6,404,860 B1 * | 6/2002 | Casellini | 379/88.17 |
| 6,421,688 B1 * | 7/2002 | Song | 1/1 |
| 6,430,602 B1 | 8/2002 | Kay et al. | |
| 6,460,071 B1 * | 10/2002 | Hoffman | 709/203 |
| 6,477,240 B1 * | 11/2002 | Lim et al. | 379/67.1 |
| 6,477,246 B1 | 11/2002 | Dolan et al. | |
| 6,489,986 B1 | 12/2002 | Allen | |
| 6,493,324 B1 | 12/2002 | Truetken | |
| 6,498,841 B2 | 12/2002 | Bull et al. | |
| 6,564,261 B1 | 5/2003 | Gudjonsson et al. | |
| 6,580,787 B1 | 6/2003 | Akhteruzzaman et al. | |
| 6,587,877 B1 | 7/2003 | Douglis et al. | |
| 6,594,255 B1 * | 7/2003 | Neuman | 370/352 |
| 6,594,277 B1 | 7/2003 | Chiang et al. | |
| 6,601,041 B1 | 7/2003 | Brown et al. | |
| 6,606,373 B1 * | 8/2003 | Martin | 379/88.01 |
| 6,711,241 B1 * | 3/2004 | White et al. | 379/88.17 |
| 6,732,123 B1 * | 5/2004 | Moore et al. | 1/1 |
| 6,735,193 B1 * | 5/2004 | Bauer et al. | 370/352 |
| 6,741,678 B2 | 5/2004 | Cannell et al. | |
| 6,757,534 B2 | 6/2004 | Bach et al. | 455/417 |
| 6,757,732 B1 * | 6/2004 | Sollee et al. | 709/227 |
| 6,785,695 B1 * | 8/2004 | Hamilton et al. | 1/1 |
| 6,798,873 B2 * | 9/2004 | Vardi et al. | 379/201.01 |
| 6,876,973 B1 | 4/2005 | Visconti | |
| 6,944,655 B1 | 9/2005 | Bellamy et al. | |
| 6,950,503 B2 * | 9/2005 | Schwartz et al. | 379/88.13 |
| 7,107,292 B1 * | 9/2006 | Hrle et al. | 1/1 |
| 7,197,120 B2 * | 3/2007 | Luehrig et al. | 379/88.14 |
| 7,219,136 B1 * | 5/2007 | Danner et al. | 709/219 |
| 7,359,492 B2 * | 4/2008 | Myers et al. | 379/88.01 |
| 7,363,633 B1 * | 4/2008 | Goldick et al. | 719/328 |
| 7,664,097 B2 * | 2/2010 | White et al. | 370/352 |
| 7,933,390 B2 * | 4/2011 | Bedingfield et al. | 379/88.18 |
| 2001/0049363 A1 | 12/2001 | Rubin et al. | |
| 2002/0007397 A1 | 1/2002 | Ouzounidis et al. | |
| 2002/0023130 A1 | 2/2002 | Stettner | |
| 2002/0085701 A1 | 7/2002 | Parsons et al. | 379/211.01 |
| 2002/0103908 A1 | 8/2002 | Rouse et al. | |
| 2002/0111822 A1 | 8/2002 | Shimizu et al. | |
| 2002/0118688 A1 | 8/2002 | Jagannathan | |
| 2002/0140726 A1 | 10/2002 | Schwartz et al. | |
| 2002/0141388 A1 | 10/2002 | Schwartz et al. | |
| 2002/0143851 A1 | 10/2002 | Schwartz et al. | |
| 2002/0147811 A1 | 10/2002 | Schwartz et al. | |
| 2003/0005126 A1 | 1/2003 | Schwartz et al. | |
| 2003/0039339 A1 | 2/2003 | Luehrig et al. | |
| 2003/0123634 A1 | 7/2003 | Chee | |
| 2003/0187741 A1 | 10/2003 | Brown et al. | |
| 2010/0150142 A1 * | 6/2010 | White et al. | 370/352 |

OTHER PUBLICATIONS

PCT Written Opinion PCT/US02/10918, Jul. 29, 2003.

* cited by examiner

UPDATING MEDIATION SUBSCRIBER PROFILE

ARCHIVING INBOUND COMMUNICATION INFORMATION
220a

ARCHIVING AVAILABILITY ASSOCIATED WITH INBOUND COMMUNICATION
220b

ARCHIVING FOLLOW-THROUGH ACTION ASSOCIATED WITH INBOUND COMMUNICATION
220c

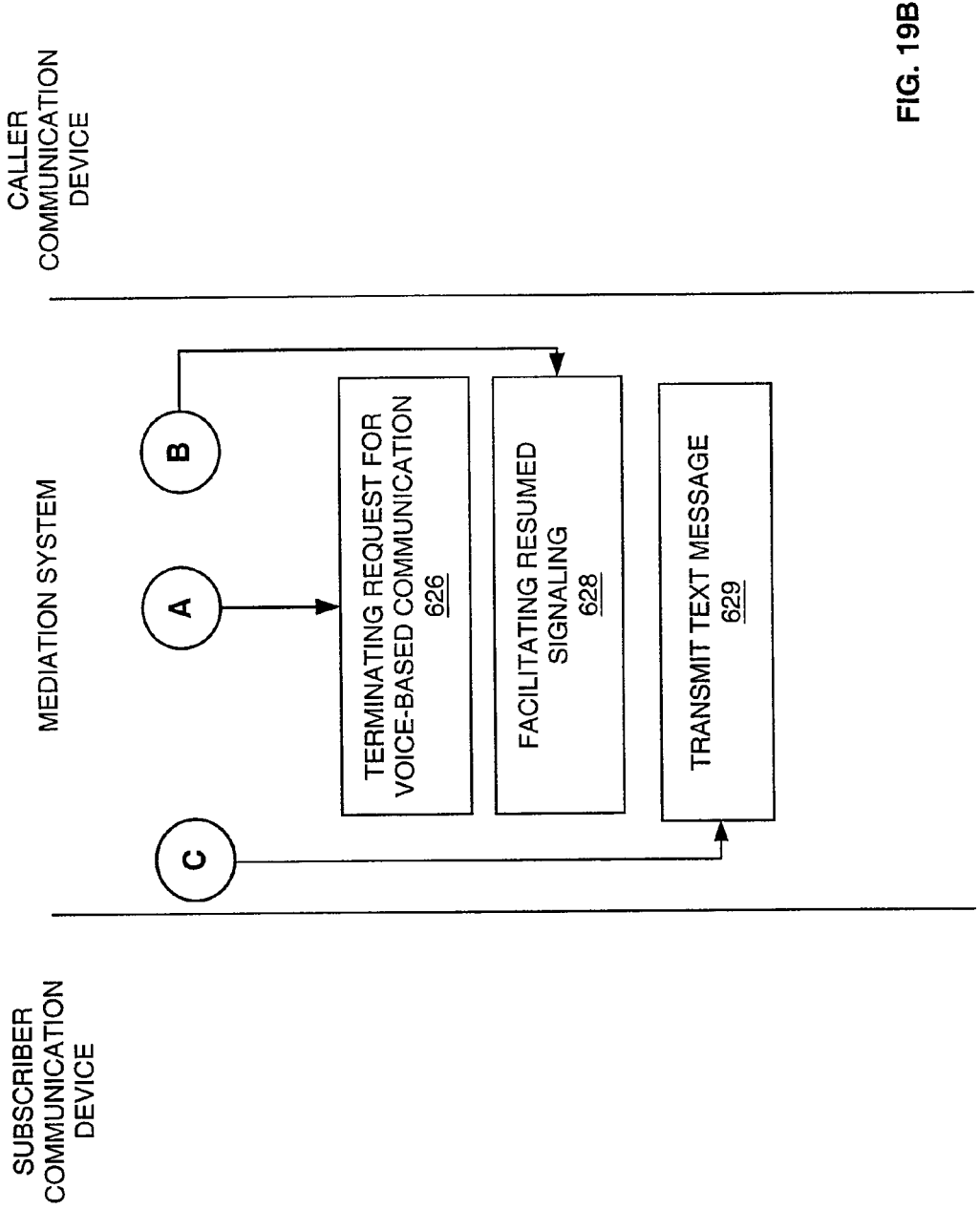

METHOD AND SYSTEM FOR FACILITATING MEDIATED COMMUNICATION

CLAIM OF PRIORITY TO PRIOR PATENT APPLICATIONS

This application is a Continuation of U.S. patent application Ser. No. 10/096,261 filed by Uwe Luehrig and Stuart Evans on Mar. 12, 2002 now U.S. Pat. No. 7,197,120 entitled "Method and System for Facilitating Mediated Communication" which (a) is a Continuation-in-Part Application of U.S. patent application Ser. No. 09/829,515 filed by Richard L. Schwartz and Stuart Evans on Apr. 9, 2001 now U.S. Pat. No. 6,950,503 entitled "Method and System for Facilitating Mediated Communication" which claims priority to U.S. Provisional Application Ser. No. 60/258,144 filed on Dec. 22, 2000 by Richard L. Schwartz et al. and entitled "Method and System For Facilitating Virtual Mediation in a Voice-Data Environment," and (b) also claims priority to U.S. Provisional Application Ser. No. 60/344,299 filed by Uwe Luehrig et al. on Dec. 28, 2001 entitled "Method and System Utilizing the Subscriber Identity Module of Mobile Equipment for Called-Party Inbound Voice Call Notification Resulting in a Real-Time Personalized Multi-Level Menu Dialog with the Caller."

FIELD OF THE DISCLOSURE

The disclosures herein relate generally to communication systems and more particularly to methods, systems and apparatus for facilitating virtual mediation in a voice and/or data environment.

BACKGROUND

Mobile communication devices, such as cellular telephones, two-way pagers, and wireless enabled personal digital assistants, have become mainstream. Through the use of one of these mobile communication devices, a person is accessible for participating in interactive communication as they engage in their daily activities. As a result, people are now more accessible than ever.

However, as a result of being more accessible, people are also now more unavailable for participating personally in interactive communication. In many instances, even though a person is accessible for communication, it is often inconvenient or inappropriate for the person to personally engage in interactive communication. For example, while in a meeting, a person may be accessible via their mobile communication device. However, during the meeting and for any number of reasons, it may be inappropriate or inconvenient for the person to attend personally and interactively to an inbound communication. This may be the case even though it is a telephone call or text message that the person needs to or would like to respond personally and immediately.

Call waiting, call return, voice mail, electronic assistants and unified messaging systems illustrate examples of conventional communication solutions. Such conventional communication solutions are limited in their ability to facilitate an interactive communication activity in a personalized, time-sensitive and dynamic manner when one or more participants associated with the interactive communication activity are precluded from attending personally to the interactive communication activity. Specifically, conventional solutions help with call filtering (e.g., via caller id or electronic communication assistants). These conventional solutions do not address the process of actually communicating with another party beyond facilitating manual intervention on the subscriber's part or call redirection (e.g., call forwarding or divert, follow-me). That is, they may result in a communication being redirected to another device, but do not interactively and dynamically assist with the actual communication dialog.

Therefore, a method for enabling interactive communication to be facilitated in a manner that overcomes the limitations of such conventional communication solutions would be useful.

BRIEF DESCRIPTION OF THE DRAWINGS

FIG. 8 is a diagrammatic view depicting an embodiment of steps for performing an operation of updating the subscriber profile.

DETAILED DESCRIPTION

Figure 1:
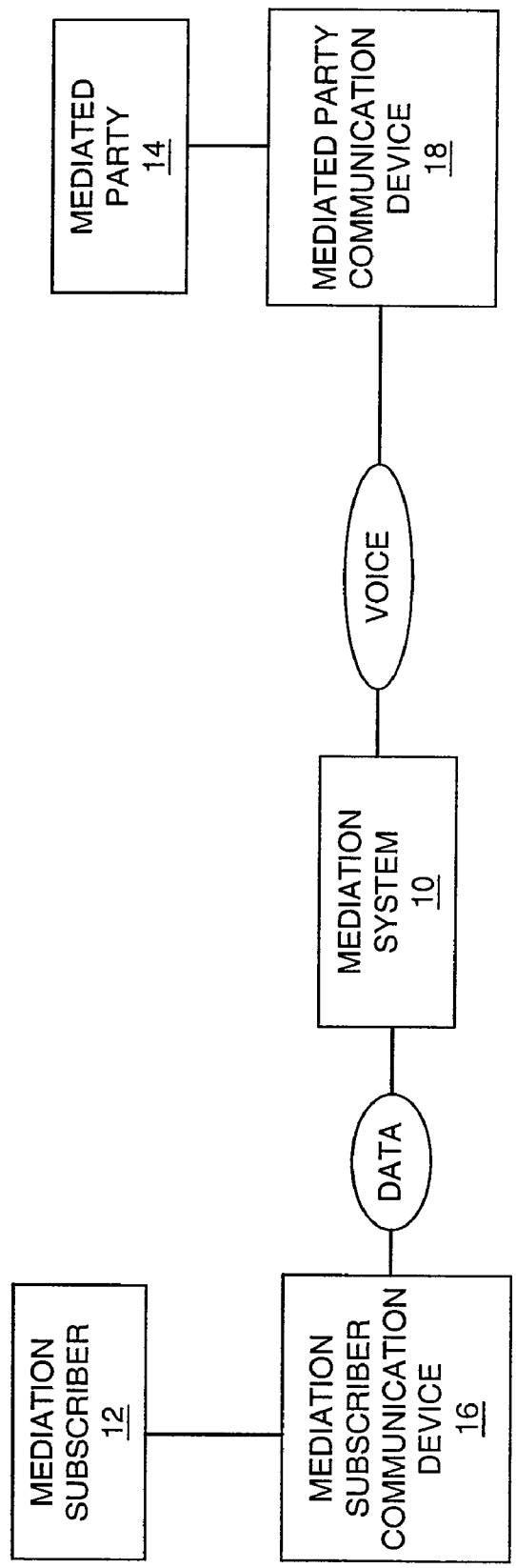
FIG. 1 is a block diagram depicting an embodiment of a communication system including a mediation system capable of mediating in an environment including voice-based and data-based communication.
Figure 2:
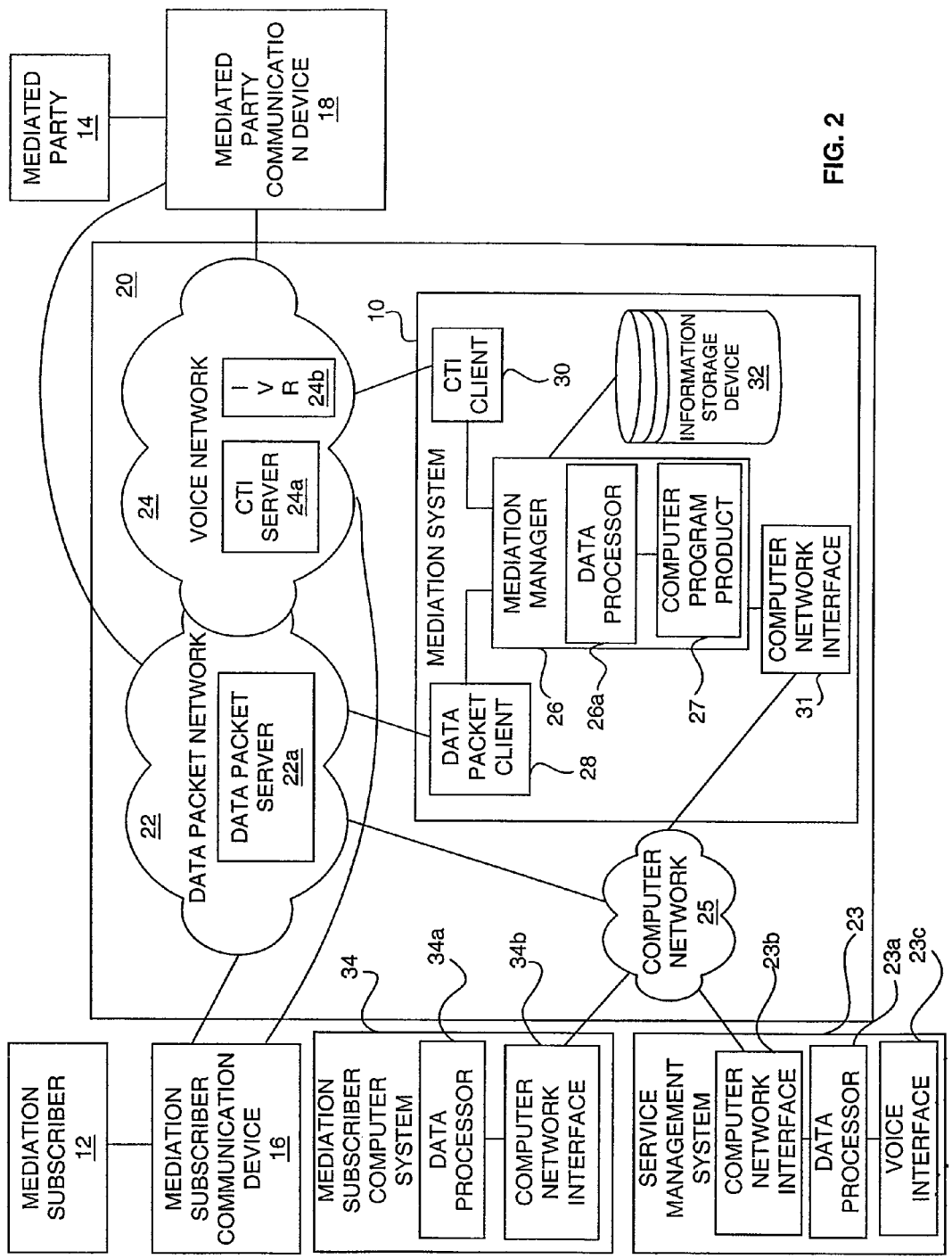
FIG. 2 is a block diagram depicting an embodiment of an apparatus capable of facilitating mediated follow-through operations via voice-based and data-based communication.

Referring to FIGS. 1 and 2, a mediation system 10 facilitates mediation between a mediation subscriber 12 and a mediated party 14. The mediation subscriber 12 communicates with the mediation system 10 through a mediation subscriber communication device 16. The mediated party 14 communicates with the mediation system 10 through a mediated party communication device 18.

As depicted in FIG. 1, communication associated with the mediation subscriber communication device 16 is facilitated in a data-based manner and communication associated with the mediated party communication device 18 is at least partially facilitated in a voice-based format. Accordingly, the mediation subscriber communication device 16 and the mediated party communication device 18 are devices capable of receiving and transmitting information in a data packet format and a voice-based format, respectively.

One aspect of the disclosure herein is that data-based communication is advantageous relative to the mediation subscriber 12 engaging in mediation activities. Specifically, data-based communication permits the mediation subscriber 12 to manage mediation activities in a time-sensitive, concise and interactive manner. Data-based communication permits the mediation subscriber party 12 to engage in mediation activities in situations where voice-based communication would be inconvenient, inappropriate or both. For example, voice-based communication proves to be less than desirable and effective in situations such as meetings or public spaces where audibly responding to communication activities is often inconvenient and inappropriate. Through the use of data-based communication, the mediation subscriber party 12 may engage in mediation activities in a non-disruptive manner by responding in a data-based format to information presented in a data-based format.

The use of data-based communication provides a quick, less disruptive interrupt for the mediation subscriber 12. Responding to communications in a data-based manner rather than a voice-based manner only requires glancing down and the pushing of buttons. This type of an interruption can typically be tolerated without significantly disrupting the surrounding activities. There is no such voice-based communication equivalent for inaudibly and time-effectively responding to a communication in a voice-based manner. For example, it is time consuming to answer a call, engage the other party, explain that you are unavailable, and (for example) find out from the mediated party if you can call back when your meeting is over. In a voice-based format, this type of communication can be significant. Furthermore, call screening or other filtering systems offer little relief in this regard because they do not promote communication with the mediated party.

One method for accomplishing data-based communication includes communicating information via data packets. General Packet Radio Service (also referred to as GPRS) is a packet-based service that allows information to be sent and received, as data packets, across networks, such as digital cellular networks that support GPRS. For example, a Global System for Mobile Communications (also referred to as GSM) network is one example of a digital mobile telephone network that can be configured to support GPRS. GPRS facilitates transmission of data packets between mobile communications networks and the Internet. As a result, GPRS is considered to be a sub-network of the Internet with GPRS capable mobile phones being viewed as an access device. Accordingly, access to the Internet is available to mobile users via GPRS.

Data packet network services, such as GPRS, bring together high-speed radio access and Internet Protocol (IP) based services into one, powerful environment. IP is a packet-based protocol associated with the Internet that allows active communication devices to be "on line" at all times and only pay for data that is actually sent or received. In this manner, a connection between an active communication device and the network is always present. As a result, data is sent and received more efficiently than commercially implemented switched-based protocol because a network connection does not first need to be established.

GPRS is designed for digital cellular networks (GSM, DCS, PCS, TDMA). For example, with respect to GSM networks, GPRS can be viewed as an overlay network onto second-generation GSM networks. It utilizes a packet radio principle and can be used for carrying subscriber packet data protocol information between GPRS enabled devices on GPRS compatible networks and other types of packet data networks such as the Internet. GPRS is standardized by the ETSI (European Telecommunications Standards Institute), and allows voice and data communication to share a common connection. That is, unlike current circuit-switched technology, data packets can arrive/be sent even while voice communication is active and vice-versa. Accordingly a voice-based communication can be in progress while receiving and sending data and vice-versa.

Networks supporting GPRS provide an "always-on" connection with a client device such as a smart phone. Information can be retrieved rapidly because the client device is "always-on" in the network. Accordingly, the visual display of a GPRS enabled device is sometimes referred to as an "always-on" display.

GPRS network resources are used only when a subscriber is actually sending or receiving data. Rather than dedicating a radio channel to a GPRS subscriber for a fixed period of time, available GPRS resources can be concurrently shared between several subscribers. As GPRS is a radio resource, this efficient use of scarce radio, i.e. frequency, resources means that large numbers of GPRS subscribers can potentially share the same bandwidth and be served from a single cell. The actual number of subscribers supported depends on the application being used and how much data is being transferred.

GPRS enables mobile Internet functionality by allowing compatibility between existing Internet and GPRS compatible networks. Any service that is used over the fixed Internet today, such as File Transfer Protocol (FTP), chat, email, HTTP, and fax, are also available over GPRS compatible networks. Furthermore, because GPRS enables mobile device users to effectively and efficiently access the Internet, web browsing is a very important application for GPRS.

An embodiment of an apparatus 20 for enabling mediation activities to be facilitated by the mediation subscriber communication device 16 and the mediated party communication device 18 is depicted in FIG. 2. As illustrated, a mediation subscriber communication device 16, mediated party communication device 18, mediation subscriber communication system 34 and service management system 23 are depicted as communicating via the apparatus 20. In practice, the apparatus 20 facilitates mediated communication for a plurality of mediation subscriber communication devices, mediated party communication devices, mediation subscriber communication systems and service management systems.

The apparatus 20 includes the mediation system 10, a data packet network 22, a voice network 24, and a computer data network 25. The mediation system 10 is connected to the data packet network 22, to the voice network 24 and to the computer data network 25, thus enabling communication therebetween. The computer network 25 is connected to a mediation subscriber computer system 34, to the mediation manager 26 and to a service management system 23 of a service provider, thus enabling communication therebetween.

The voice network 24 includes a computer telephone interface (CTI) server 24a and an interactive voice response (IVR) system 24b. The CTI server 24a is connected to the IVR system 24b. The IVR system enables interactive voice response from the mediated party to be received by the mediation system and transformed into a computer-based communication format. Commercially available IVR systems include systems developed and sold by IBM Corporation and from Periphonics Corporation.

In many situations, it is desirable and advantageous for the mediation subscriber communication device 16 to communicate directly with the mediated party communication device 18. In such situations, the mediation subscriber communication device 16 communicates with the mediated party communication device 18 without intervention by the mediation system 10. To facilitate data-based communication between the mediation subscriber communication device 16 and the mediated party communication device 18, the mediation subscriber communication device 16 is connected to the mediated party communication device 18 through the data packet network 22. To facilitate voice-based communication between the mediation subscriber communication device 16 and the mediated party communication device 18, the mediation subscriber communication device 16 is connected to the mediated party communication device 18 through the voice network 24. Accordingly, both voice and data can be passed through the mediation system 10 without intervention, or the communication can be re-routed so that the mediation system 10 is not in the communication path.

The mediation system 10 includes a mediation manager 26 with a data packet client 28, a computer telephone interface (CTI) client 30, a computer network interface 31 and an information storage device 32 connected thereto. A Dell PowerVault™ series storage device is one example of the information storage device 32. The data packet network 22 includes a data packet server 22a that enables communication between the data packet network 22 and the data manager 26 via the data packet client 28. The voice network 24 includes a computer telephone interface (CTI) server 24a that enables communication between the data packet network 22 and the mediation manager 26 via the CTI client 30.

The mediation manager 26 includes a data processor 26a, such as a network server, a workstation or other suitable type of data processing device. The computer interface 31 is connected between the data processor 26a and the computer network 25 for enabling communication therebetween. A Dell PowerEdge™ series server is one example of a suitable commercially available network server. A Dell Precision™ series workstation is one example of a suitable commercially available workstation. The information storage device 32 is connected to the data processor 26a for storing information in non-volatile memory and retrieving information therefrom.

A computer program product 27 includes a computer program that is process able by the data processor 26a of the mediation manager 26. The computer program enables facilitation of at least a portion of the operations performed by the mediation system 10 for accomplishing the methods disclosed herein. The computer program is accessible by the data processor 26a of the mediation manager 26 from an apparatus such as a diskette, a compact disk, a network storage device or other suitable apparatus.

The service management system 23 includes a data processor 23a, computer network interface 23b and a voice network interface 23c. The computer network interface 23b is connected to the computer network 25 for enabling data-based communication between the service manager 23a and the mediation system 10 via the computer network 25. The voice network interface 23c is connected to the voice network 24 for enabling voice-based communication between the service manager 23a and the mediation system 10 via the voice network 24.

The mediation subscriber computer system 34 includes a data processor 34a and a computer network interface 34b. The computer interface 34b is connected between the data processor 34a of the mediation subscriber computer system 34 and the computer network 25 for enabling communication therebetween.

A mobile telephone capable of transmitting and receiving data packets via the General Packet Radio Service (GPRS) is one example of the mediation subscriber communication device 16. GPRS enabled mobile telephones, also referred to as "Smart Phones," are offered by manufacturers such as Ericsson Incorporated and Nokia Incorporated. Smart phones are mobile phones with built-in voice, data, and Web-browsing services. Smart phones integrate mobile computing and mobile communications into a single terminal. Smart phones, importantly, can execute Java programs within the device. Java programs can be used to control presentation and interaction with the user, as well as send and receive data packets. The Ericsson models R380 and R520 telephones and the Nokia 9000 series telephone represent specific examples of GPRS enable mobile telephones.

Figure 3:
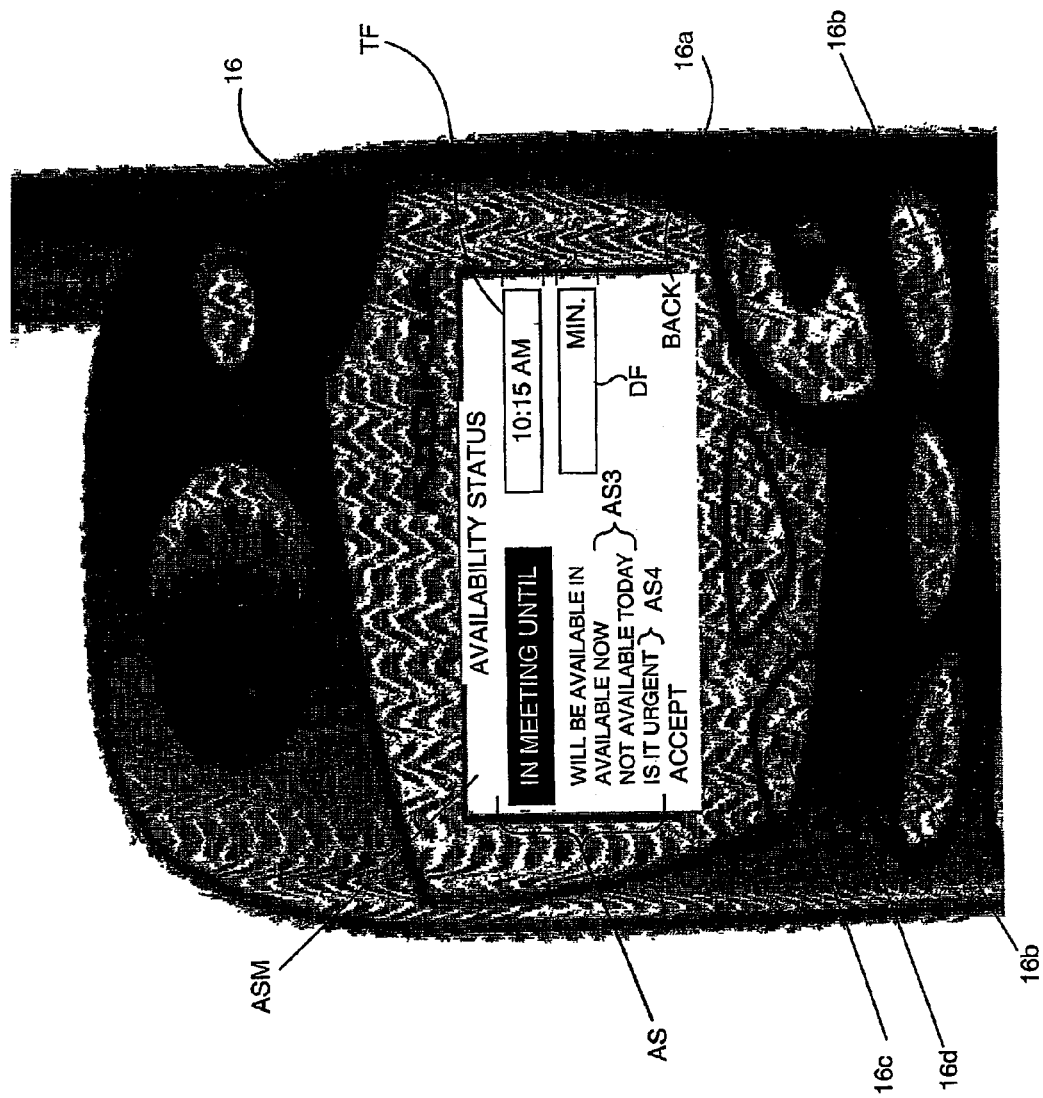
FIG. 3 is a diagrammatic view depicting an embodiment of a menu for specifying an availability status.

Referring to FIG. 3, the mediation subscriber communication device 16, such as a smart phone, includes a user interface. The user interface of the mediation subscriber communication device 16 includes a data interface portion and a voice interface portion. In the embodiment of the mediation subscriber communication device 16 depicted in FIG. 3, the user interface includes a visual display 16a, a plurality of alphanumeric keys 16b, a plurality of control keys 16c and a scroll key 16d. The voice interface portion of the user interface includes a speaker 16e and a microphone 16f.

The data interface portion of the user interface permits information to be visually displayed and permits the mediation subscriber 12 to interactively manipulate information associated with data-based communications between the mediation subscriber communication device 16 and the mediation system 10. The visual display 16a permits information to be visually displayed. The plurality of alphanumeric keys 16b permit alphanumeric information to be input. The plurality of control keys 16c permit associated functionality to be selected. For example, functional operations, such as accept and cancel, displayed on the visual display 16a may be associated with respective control keys 16c. The scroll key 16d permits menu information such as availability specifiers AS to be highlighted and manipulated.

It should be understood that other types of devices also represent suitable examples of the mediation subscriber communication device 16. Personal digital assistants (PDAs) such as those offered by Palm Computing and Handspring are data-centric devices that are capable of providing mobile wireless access. These devices can utilize GPRS through a GPRS-capable mobile phone via a serial cable or directly if they have built-in GPRS capability. Similarly, suitably equipped mobile computers are also capable of communicating data packets over a GPRS compatible network.

The apparatus, systems and devices discussed and disclosed herein permit mediation of an inbound or outbound communication to be facilitated electronically, yet in a dynamic, personalized and time-sensitive manner. In one embodiment, the methods disclosed herein are not governed exclusively by user-defined rules and designations. In these embodiments, it is advantageous for these methods to be facilitated in large degree by system-defined information. System defined information is information garnished by the mediation system in response to facilitating mediation operations. Furthermore, it is desirable to require the mediation subscriber to define and maintain only a minimal amount of designated information (also referred to herein as user-defined information).

One example of user-defined information is an availability status of the mediation subscriber. The availability status defines qualitative aspects of the mediation subscriber's availability and, in some cases, also defines quantitative aspects of the mediation subscriber's availability. As depicted in FIG. 3, an availability status menu ASM is displayable on a visual display 16a of the mediation subscriber communication device 16.

The availability status menu ASM includes a plurality of availability specifiers AS. For a first type of availability specifier AS1, a time indicating availability is specified in a time field TF. For example, the mediation subscriber 12 may specify that he will be in a meeting until a designated time, such as 10:15 AM. For a second type of availability specifier AS2, a duration quantitatively indicating availability is specified in a duration field DF. For example, the mediation subscriber 12 specifies availability in a designated amount of time, such as 10 minutes. For a third type of availability specifier AS3, the selected availability status itself defines a relative (qualitative) time designating the availability of the mediation subscriber 12. For example, the mediation subscriber 12 may designate that he is available now. For a fourth type of availability specifier AS4, a priority of the communication request by the mediated party is queried. For example, the mediation subscriber may select an availability specifier that results in the urgency of the communication request being mediated by the mediation system 10.

Figure 4:
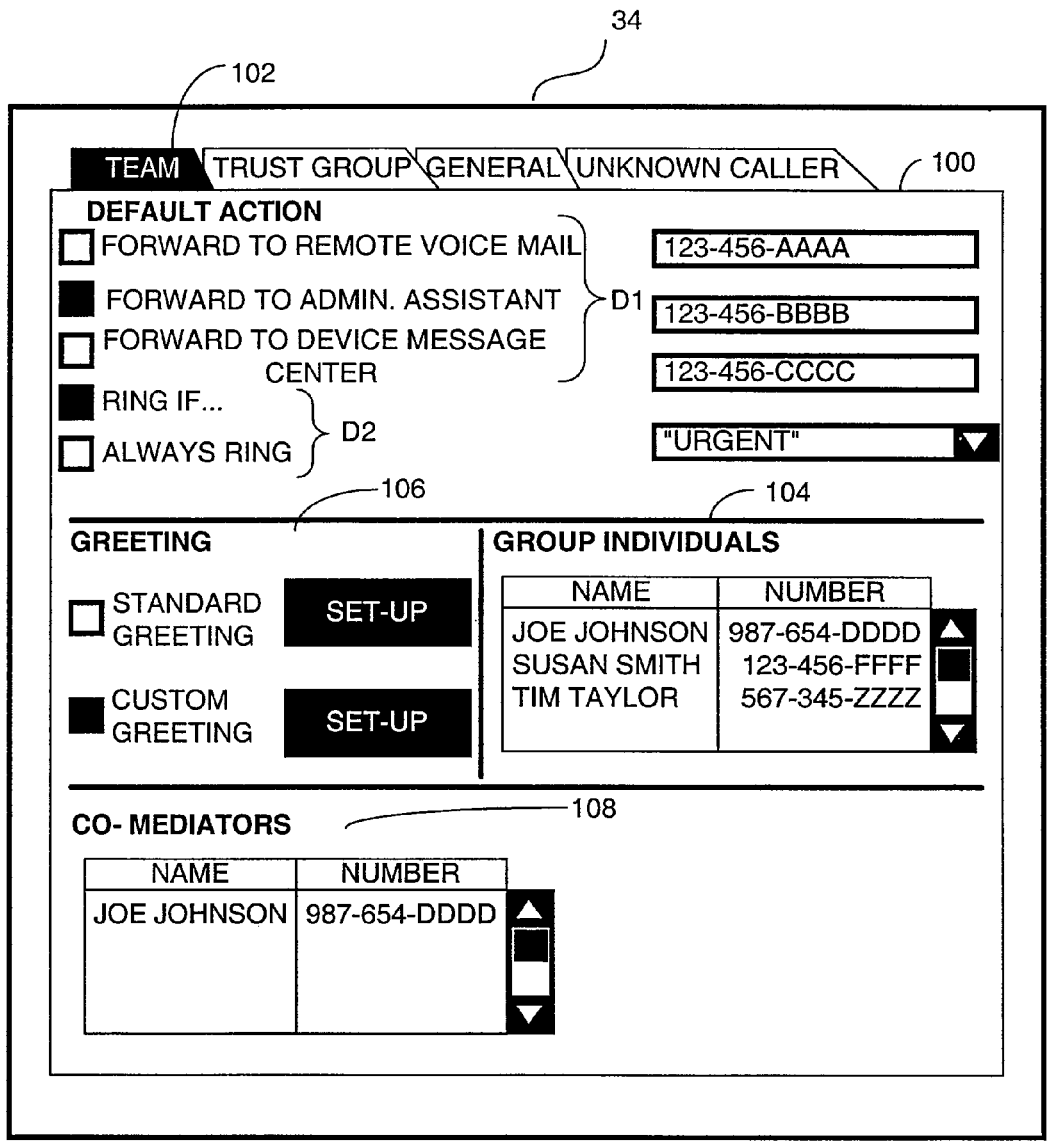
FIG. 4 is a diagrammatic view depicting an embodiment of a mediation subscriber policy.

Another technique for providing subscriber specified preferences and information includes the preparation of one or more policies. An embodiment of a policy 100, as viewed via visual display 34' of the mediation subscriber computer system 34, is depicted in FIG. 4. Information included in the policy 100 may be provided via the mediation subscriber communication device 16, via the mediation subscriber computer system 34, or both.

The policy 100 includes a tab 102 that may be used to specify a name for a particular group of individuals associated with the policy 100. At a group field 104, the mediation subscriber may specify one of more specific individuals that apply to the policy 100. Information such as the name and one or more telephone numbers associated with each individual is specified at the group field 104. At a greeting field 106, the mediation subscriber may designate and set-up a desired greeting. For example, the mediation subscriber may designate a standard greeting or a custom greeting. The standard greeting is a greeting that would be applied to any policy that does not specify a custom greeting. At a co-mediator field 108, the mediation subscriber may designate one or more co-mediators associated with the policy 100. Each designated co-mediator is thus authorized by the mediation subscriber to engage in mediation of a communication request received by the mediation subscriber.

Still referring to FIG. 4, the mediation subscriber may designate a default action to be performed by the mediation system in instances when a follow-up action for a particular communication is not provided by the mediation subscriber in response to being prompted for one by the mediation system. A first set of default actions D1 define actions that are taken in instances where a follow-up action by the mediation subscriber is not provided in response to the mediation system prompting the mediation subscriber for a follow-up action. For example, the mediation subscriber may designate a default action from the first set of default actions D1 for instructing the mediation system to forward applicable communications to the mediation subscriber's administrative assistant. A second set of default actions D2 defines a plurality of follow-up actions that designate an initial action associated with applicable communications. For example, the mediation subscriber may designate a default action from the second set of default actions D2 for instructing the mediation system to 'Schedule A Time To Talk' with the mediated party (team member) if a particular criteria C1 is met, such as a communication being designated as urgent.

An embodiment of a method for facilitating a mediation session initiated by an inbound communication request is depicted in FIG. 5. The apparatus 20, as shown in FIG. 2, illustrates an example of an apparatus capable of carrying out the method depicted in FIG. 5. At a block 200, an inbound communication request from the mediated party communication device 18 is received by the mediation system 10. Information may be communicated between the mediation subscriber communication device 18 and the mediation system 10 via data packets over a suitable network. An inbound telephone call illustrates one example of the inbound communication request.

In response to receiving the inbound communication request, an applicable context and behavior information are determined at a block 201. In response to determining that a policy does not apply to the inbound communication request at a block 202, a contextual communication summary is prepared and the contextual communication summary is communicated to the mediation subscriber communication device 16 at, a block 203 and a block 204, respectively. Information provided by a carrier caller identification service, such as a caller's name and phone number and information relating to acts initiating the communication from the mediated party 12, such as returning a call from the mediation subscriber 14, may comprise a portion of the information included in the contextual communication summary. Behavior information is discussed in greater detail below. At a block 206, a plurality of follow-through actions is prepared. In other embodiments, only one follow-through action is prepared.

At a block 208, the mediation subscriber 12 may choose to accept the inbound communication or defer the inbound communication to a mediation operation. In the case where the mediation subscriber 12 chooses to accept the inbound communication, a connection is facilitated at a block 210 between the mediation subscriber communication device 16 and the mediated party communication device 18 over a suitable voice network, such as the voice network 24 illustrated in FIG. 2. In the case where the mediation subscriber 12 chooses to defer the associated inbound communication, at a block 213, the plurality of follow-through actions is communicated to the mediation subscriber communication device 16 at a block 212.

It should be noted that a plurality of operations, such as communicating the contextual communication summary to the mediation subscriber and preparing the plurality of follow-through actions may be performed concurrently. For example, mediation operations between the mediation system and the mediation subscriber may be performed while the telephone is ringing. In this manner, time may be used efficiently, thus reducing the time which the mediated party is awaiting either a personal or mediated response. It should also be noted that the contextual communication summary and the follow-through actions may be communicated essentially simultaneously such that the mediation subscriber nearly immediately has all the information necessary to address the inbound communication request.

In response to the mediation subscriber 12 selecting one of the follow-through actions, a selected follow-through action is received by the mediation system 10 from the mediation subscriber communication device 16 at a block 214. In response to receiving the selected follow through action, a mediation follow-through operation is facilitated at a block 216. In response to facilitating the mediation follow-through operation, a mediation subscriber profile is updated at a block 218. As discussed below, updating the mediation subscriber profile includes updating at least one data set, such as a mediation activity data set, in a mediation subscriber profile.

In response to determining at the box 202 that a policy, such as the policy depicted in FIG. 4, does apply to the inbound communication request and determining at a block 222 that that the policy requires always ringing the mediation subscriber 12, the method continues at the block 210. In response to determining at the block 222 that policy-driven mediated follow-through is required, the method continues at the block 216. In the case of policy-driven mediated follow-through, facilitating mediated follow-through at the block 216 is performed, at least in part, according to the follow-through action designated in the policy.

The mediated follow-through operation performed at the block 216 depicts an example of a virtual mediation operation. By virtual mediation operation, it is meant that the mediation operation is performed by the mediation system on behalf of the mediation subscriber 12. For example, the mediation can be performed in an automated manner by data processing device as described herein. Virtual mediation adds a high degree of personalization to acting on behalf of the mediation subscriber 12. To this end, the virtual mediation operation is performed based on contextual and behavioral information associated with the mediation subscriber 12.

It should be understood that rather than choose to accept the inbound communication or select one of the follow-through actions, the mediation subscriber 12 may choose to do nothing (neither accept nor defer the inbound communication). By the mediation subscriber 12 choosing to not accept the call nor to select one of the follow-through actions (block 213), a system-imposed follow-through action, such as the default action discussed above in reference to FIG. 4, is identified by the mediation system 10 at a block 220. Accordingly, when the mediation subscriber 12 chooses to neither accept nor defer the inbound communication, the mediation follow-through operation is facilitated according to the system imposed follow-through action.

It is also contemplated that a system-defined action based on contextual information, historical information, and behavioral information may be imposed rather than default actions associated with user-defined information. For example, the mediation subscriber 12 is in a meeting and has received three calls from unknown parties. In all three cases, the mediation subscriber 12 has selected a follow-through action requesting that the mediated (unknown) party 14 schedule a time to talk. Accordingly, for all subsequent unknown callers while the mediation subscriber 12 is in the meeting, the mediation system 10 automatically initiates a mediated follow-through operation for scheduling a time to talk. A pre-defined number of occurrences may need to occur first, such as three attempts from unknown callers, prior to the mediation system 10 imposing, for example, a system defined follow-through action. In this example, the follow-through action imposed by the mediation system 10 is a system-defined behavior-based follow-through action.

Example 1

Inbound Call Mediation

Figure 6:
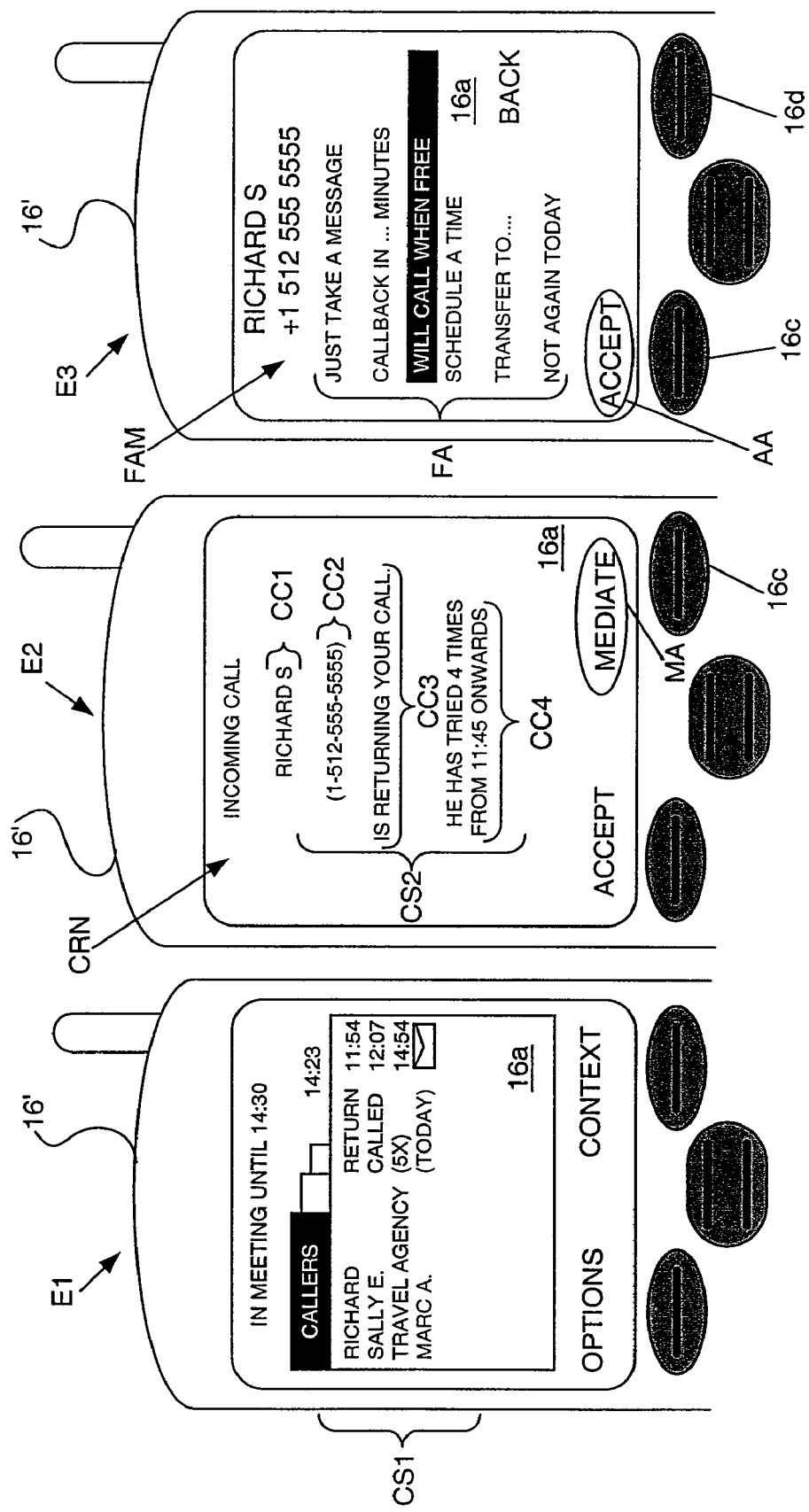
FIG. 6 is a diagrammatic view depicting an embodiment of a sequence of events associated with deferring an inbound call from a mobile telephone to a mediation system.

David is in an important meeting in which it would be seen as disruptive to verbally respond to incoming communications received on his wireless telephone 16'. As depicted in FIG. 6, at a first interaction event E1, David visually reviews a caller summary CS1. The caller summary includes contextual information associated with prior incoming calls that he has not accepted. At some prior point in time, David has communicated his availability status to the mediation system. Accordingly the mediation system knows that David is planning on being in this meeting until 14:30 hours.

After reviewing the caller summary CS1, a second interaction event E2, David receives an incoming call from Richard S. In response to receiving the incoming call, a communication summary CS2 is displayed on the visual display 16a of his wireless telephone 16'. By reviewing the communication summary CS2, David is able to quickly and non-disruptively ascertain that the incoming call is from Richard S. and that Richard S. has made repeated attempts to return a call from David. Because David is still in the meeting, he chooses to defer the call for virtual mediation by selecting the control key 16c associated with a defer action DA.

In response to choosing the defer action DA, a follow-through action menu FAM is displayed on the visual display 16a at a third interaction event E3. The follow-through action menu includes a plurality of follow-through actions FA. David uses the scroll key 16d to highlight the follow-through action 'Will call when free' and confirms the selection by depressing the control key 16c associated with an accept action AA.

Because David responded to the inbound communication using a data-based communication format, he was able to review the available contextual information and implement a desired follow-through action without disrupting the meeting. Furthermore, it only took David a short period or time (e.g. about 10 seconds) to review the available contextual information and implement the desired follow-through action. While David is still participating in the meeting, the mediation system has engaged in a virtual mediation operation for notifying Richard (the mediated party) that David will call him after the meeting.

As a result of David having provided his availability status to the mediation system, the mediation system uses the availability status in performing the mediation operation. The mediation system lets Richard know that David is in a meeting until 14:30 hours and will return his call after this time. In this manner, a more personalized and efficient communication is facilitated between the mediation system and Richard.

The "schedule a time" follow-through action depicted in FIG. 6 is one embodiment of a follow-through action for mediating a coordinated arrangement for person-to-person communication to be facilitated. In such an embodiment, the mediation system 10 mediates an agreed upon time and/or day for the mediation subscriber 12 and the mediated party 14 to communicate.

Context and contextual, as referred to herein, relate to experiences, actions, and information associated with a communication. For example, the contextual communication summary CS2, as shown in FIG. 6, includes a plurality of context components. A first context component CC1 is associated with a name of the mediated party. A second context component CC2 is associated with a phone number of the mediated party. A third context component CC3 is associated with the reason for the communication. A fourth context component CC4 is associated with prior attempts by the mediated party to contact the mediation subscriber.

Together, these context components CC1-CC4 provide the mediation subscriber with a brief yet insightful summary of the inbound communication. In other embodiments, the contextual communication summary includes only one context component, such as the phone number of the mediated party. The actions of the mediation subscriber and the mediated party result in an abundance of contextual information associated with the inbound communication being generated. Furthermore, completed and on-going mediation operations generate information associated with such mediation operations. Such information is useful in determining system-defined information, such as system-defined default actions mentioned above.

It will be appreciated that, in addition to the contexts previously discussed, there are many other types of contextual data that may be used to control communication between parties. Table 1 lists specific context types and embodiments. Accordingly, mediation steps can be based upon the various contexts described herein, including those of Table 1.

TABLE 1

| | |
|---|---|
| Presence | Presence of one or more parties to a mediation communication. The Presence of a party defines their availability for communication via various channels (e.g. phone or Instant Messaging (chat). Presence may be set by the party (i.e. they choose NOT to be available, or by physical limitations (out of range). Presence identifies what channels a user can be reached via at any given time. |
| Location | The location of one or more parties to a mediated communication. The location will generally be the location of the mediation device, and in one embodiment, can be determined automatically based on data available to the wireless communications system, or other positioning system such as a Global Positioning System. In another implementation, a party can manually specify their location or an alternate location. |
| Time | Time that the party is in. For the subscriber, this could be with respect to Mediation policies ("deny all business calls after 7 pm" or "Deny all calls when I am busy") and also for managing or warning about scheduled meetings ("Incoming call from Sally, but you have a meeting in 5 minutes"). |
| Identity | Identity and number/address that Mediated party is using. For the subscriber, this could be with respect to Mediation policies ("deny all calls unless it's Sally"). |
| Communication History | The history of communication interactions and follow through actions between caller and subscriber may influence the options or priority of options to be taken. |
| Membership | The membership of a caller, as organized in the subscribers address book may influence which policies of mediation apply. E.g. "Deny all business calls after 7 pm" means if caller has been assigned as a "business" caller then deny their call after 7 p.m. |

It will be further appreciated that, in addition to those mediation actions and follow-through mediation actions described, there are many other types of actions that may be used to control communication between parties. Table 2 indicates specific action types and embodiments.

TABLE 2

| | |
|---|---|
| Forward Call | A party to a mediated communication can request the call be forwarded to a different party, such as an assistant. |
| Leave Message | A party to a mediated communication can request that caller be asked to leave a message. |
| Request call back or message (VM/SMS/Email) | Subscriber may, via the mediation service, request that the caller call later (e.g. when both are free) or send a simple message via certain channels. |
| Promise to call back | Subscriber may, via the mediation service, tell the caller that they will return the call in due course. |
| Schedule a meeting (conf call or other) | Subscriber may, via the mediation service, request that the caller arrange a time (when both a free) to talk. |
| Use Internet Chat (Instant Messaging) | Subscriber may, via the mediation service, suggest transferring the form of communication to on-line chat (when they are in a conference for example). |
| Deny call, side effecting policy change | Deny the call to the user, but at the same time define a policy or rule that will affect the policy for subsequent calls from that caller (e.g. "No more calls from him today"). |
| Deny call and send message | Deny the call to the user (e.g. in a meeting), but opt to send them a text message. |
| Deny call and send "canned" message | Deny the call to the user but select a "canned/pre-recorded" message to be displayed or "read" to the caller. |
| Ask a question | Defer taking the caller, but via the mediation service ask a question to the caller. E.g. "Is it important?" |

Figure 7:
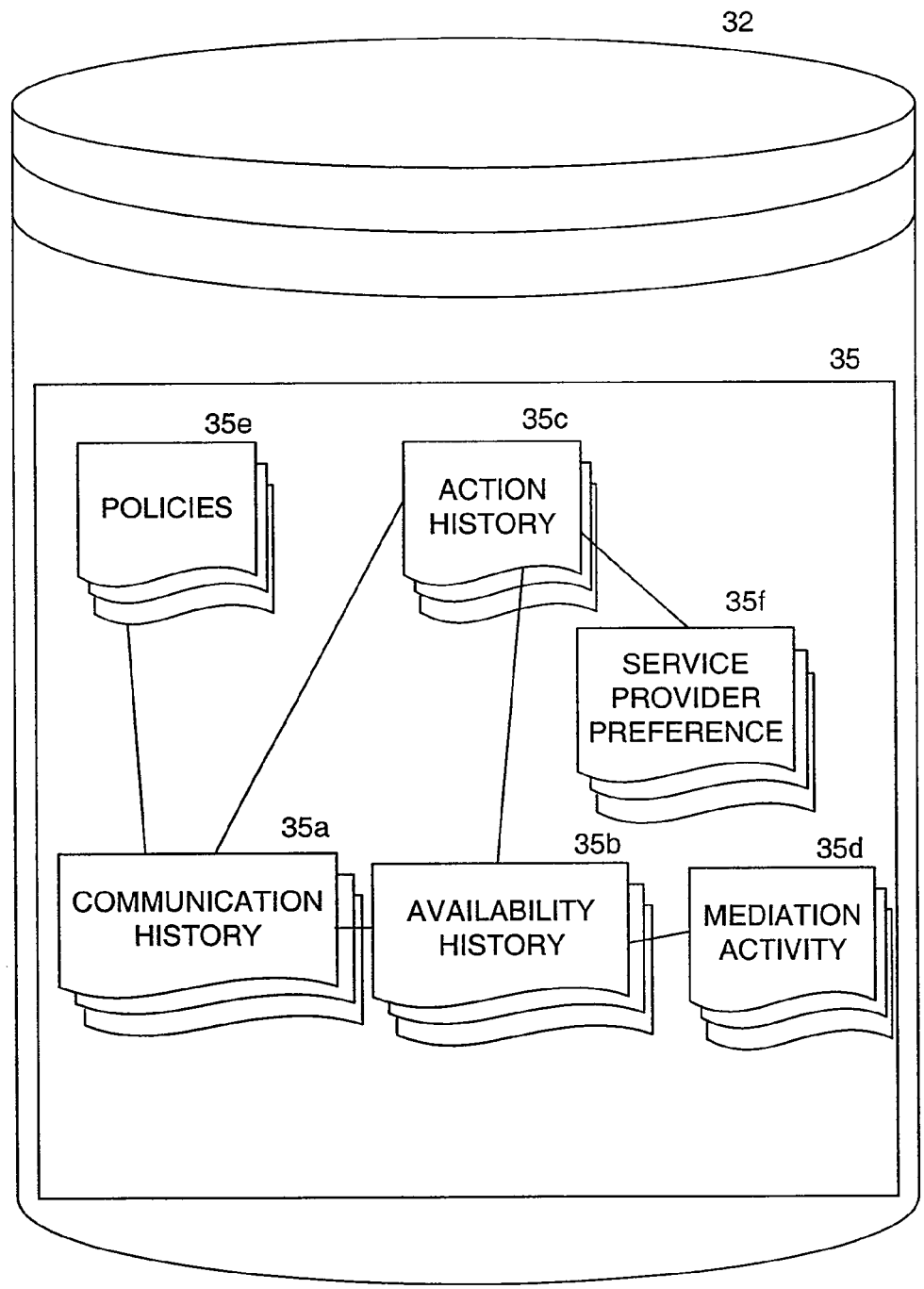
FIG. 7 is a block diagram view depicting an embodiment of a mediation subscriber profile including a plurality of information data sets.

An embodiment of the mediation subscriber profile 35 is illustrated in FIG. 7. The mediation subscriber profile 35 is stored on the data storage device 32 of the mediation system 10. The mediation subscriber profile 35 includes one or more data sets. A communication history data set 35a includes communication history information, such as the name and telephone number of the party associated with the communication. An availability history data set 35b includes availability history information of the mediation subscriber. An action history data set 35c includes follow-through action history information. A mediation activity data set 35d includes information relating to completed or in-progress mediated activities. A policies data set 35e includes the policies discussed above. A service provider data set 35f includes information such as preferences (i.e. type of room, type of food, etc) relating to mediated service that can be requested by the mediation subscriber 12.

Each one of the profile data sets 35a-35f can be associated with at least one other profile data set such that related information can be associated. For example, in one embodiment, it is desirable and advantageous to relate a particular communication from a mediated party 14 with a corresponding follow-through action and availability. Relating such information supports determining context, history and mediation status associated with a particular communication. It should also be understood that the data sets might be each maintained in separate databases or in a common database along the system depicted in FIG. 2. In addition, the data sets can have information specific to either the mediation subscriber 12 or the mediated party 14 being mediated, i.e. the caller. For example, the action history data set 35c can have a history of actions taken by either the mediated party 14 or the mediation subscriber 12.

It is one aspect of the apparatus, methods and systems disclosed herein that the information archived in the mediation subscriber profile 35 may be used to gain insight into behaviors and preferences of the mediation subscriber 12 with respect to handling inbound and outbound communications. Determining such behaviors and preferences is desirable and advantageous. In this manner, mediation operations may be carried-out dynamically and time-efficiently.

Referring to FIG. 8, an embodiment of steps for performing the operation of updating the mediation subscriber profile 35 at the block 218 in FIG. 5 is depicted. The steps for performing the operation of updating the mediation subscriber profile 35 include archiving inbound, communication information (block 220*a*), archiving the availability status of the mediation subscriber at the time of receiving the inbound communication (block 220*b*), and archiving any corresponding follow-up action (block 220*c*). Examples of the inbound communication information include a time of receipt of the inbound communication, a name of the mediated party, and a telephone number associated with the inbound communication. Archiving is defined herein to include forming relationships between information as discussed above in reference to FIG. 7.

Figure 9:
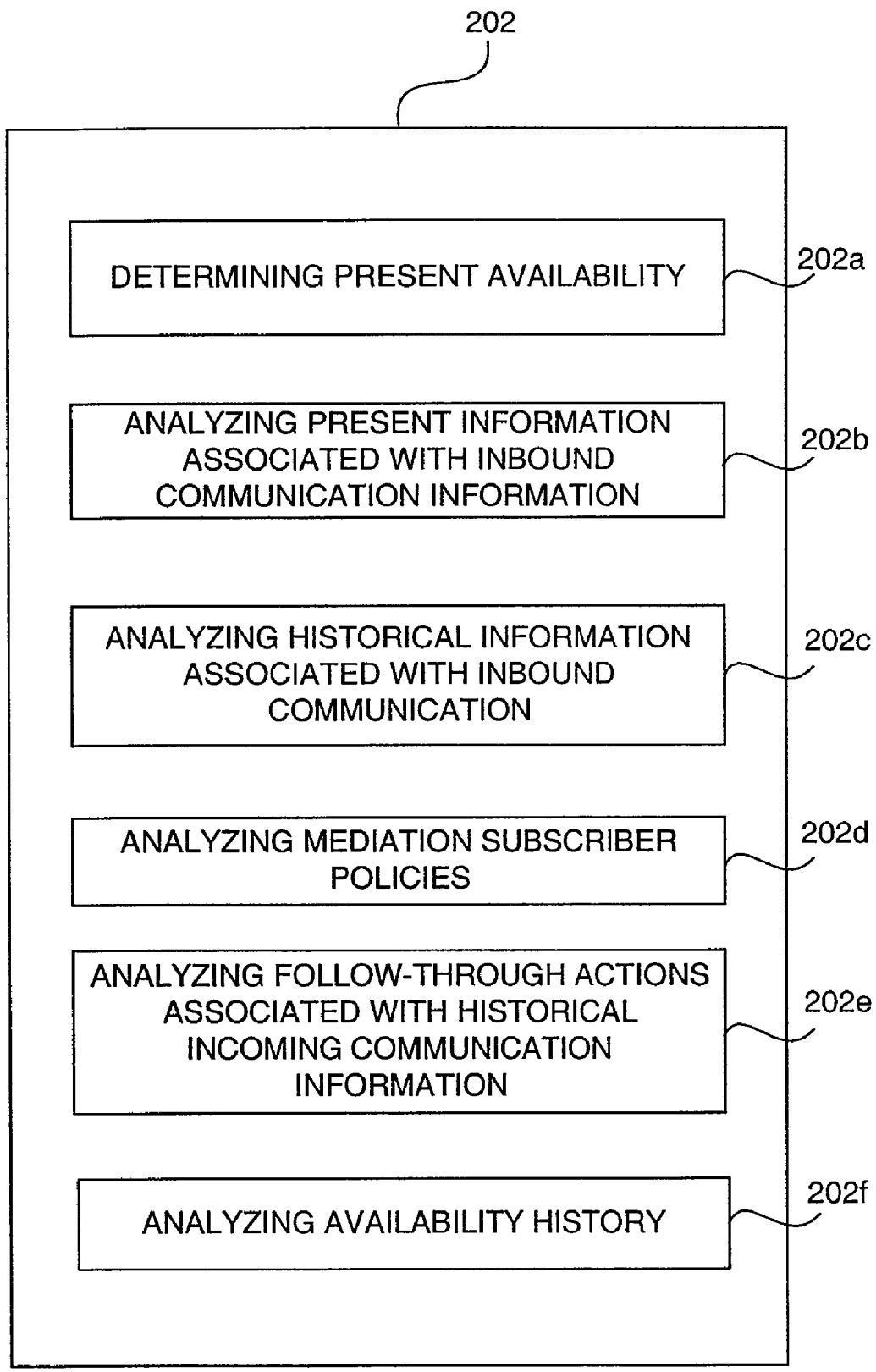
FIG. 9 is a diagrammatic view depicting an embodiment of steps for determining context and behavior to facilitate the preparation of follow-through actions.

FIG. 9 depicts an embodiment of a method for accomplishing the operation of determining applicable context and behavior by the mediated party 14, as depicted at the block 202 in FIG. 5. One example of determining the context associated with the inbound communication includes determining a present availability of the mediation subscriber (block 202*a*), analyzing present information associated with the inbound communication (block 202*b*), and analyzing historical information, such as from the mediation subscriber profile 35, that is associated with the inbound communication (block 202*c*). One example of determining a related behavior includes analyzing mediation subscriber policies (block 202*d*), analyzing follow-through actions associated with historical inbound communication information (block 202*e*) and analyzing availability history of the mediation subscriber (block 202*c*). All of the information analyzed at the block 202 is archived in the mediation subscriber profile 35 discussed above.

Figure 10:
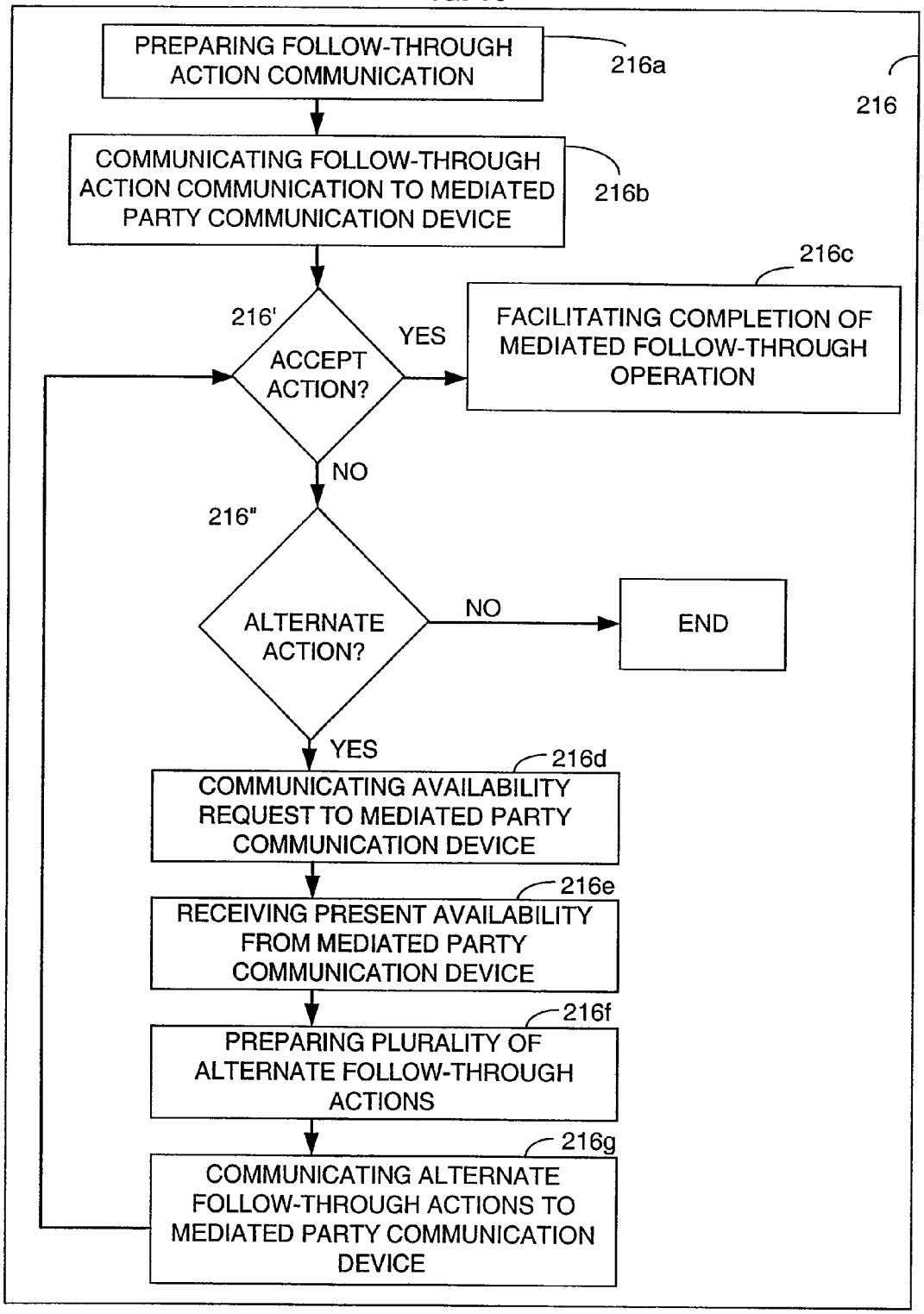
FIG. 10 is a flow chart view depicting an embodiment of a method for facilitating a mediated follow-through operation.

FIG. 10 depicts an embodiment of a method for accomplishing the operation of facilitating a mediated follow-through operation, as depicted at the block 216 in FIG. 5. At a block 216*a*, a follow-through action communication is prepared. In one embodiment, the follow-through action communication is voice-based. The follow-through action communication is communicated to the mediated party communication device 18 at the block 216*b*. In response to the selected follow-through action being accepted by the mediated party 14 at a block 216*b*, completion of the selected follow-through action is facilitated by the mediation system 10 at a block 216*c*. In response to the selected follow-through action being unaccepted able or non-actionable by the mediated party, at a block 216", the mediated party 14 may choose to terminate the communication, such as by hanging-up, or to suggest a revised follow-through action.

In response to suggesting an alternate follow-through action at the block 216", an availability request is communicated to the mediated party 14 at a block 216*d*. Prompting the mediated party 14 to reply with how long they will be available, when they will be available, or the like are examples of communicating the availability request to the mediated party communication device 18. At a block 216*e*, a present availability is received from the mediated party 14. The present availability may be received from the mediated party 14 in a voice-based format or as data entered using a device, such as a telephone keypad. At a block 216*f*, a plurality of alternate follow-through actions is prepared. In other embodiments, only one alternate follow-through action is prepared. Preparing the alternate follow-through actions includes assessing information such as the present availability of the mediated party, the present availability of the mediation subscriber, communication history, policies, etc.

It is contemplated that these alternate follow-through actions may include all or some of the non-selected follow-through actions previously sent to the mediation subscriber 12 at the block 212 in FIG. 5. Additionally, it is contemplated that all or some of the alternate follow-through actions may be availability-defined follow-through actions. By availability-defined follow-through actions, it is meant that the availability of the mediation subscriber and/or the availability of the mediated party define a specific follow-through action. A call-back time based on joint availability of the mediation subscriber and the mediated party illustrates an example of the availability-defined follow-through actions.

At a block 216*g*, the plurality of alternate follow-through actions is communicated to the mediation subscriber communication device 16 and the method continues at the block 216'. In response to the mediated party 14 accepting one of the alternate follow-through actions at the block 216', the method continues at the block 216*c*. In response to the mediated party not accepting one of the alternate follow-through actions at the block 216', the method continues at the block 216'.

Example 2

Performing Mediated Follow-Through Operation

In response to David selecting the "Will call when free" follow-through action (see Example 1), the mediation system engages in the following voice based communication with the Richard, via the NR system. "Richard, I am unavailable to talk with you right now, but will call you as soon as I am out of my meeting. I expect to be out of me meeting at 14:30 hours. If you will be available at around this time, please press 1. If you will not be available at about this time, please press 2." The communication with the mediated party may be in David's actual voice, a synthesized voice or other type of voice format.

In the instance in which Richard is available at this time, he responds accordingly by pressing 1. In response to Richard responding that he is available at this time, the mediation system communicates the following confirmation message to Richard and then terminates the call. "Richard, I'll call you shortly after 14:30 hours. I look forward to talking with you then. Good-bye."

In the instance in which Richard is not available at this time, he responds accordingly by depressing 2. The mediation system then engages in the following voice-based communication with the Richard, via the NR system, in an attempt to proceed according to an alternate and mutually acceptable follow-through action. "Richard, I would like to connect with you. After the tone, please key in a time that you are available to talk so that I can attempt to accommodate your schedule." After the tone, Richard uses the telephone keypad to enter a time, such as 15:45 hours. In some instances, it may be desirable to use voice recognition for receiving contextual information and responses from Richard.

In response to receiving the time specified by Richard, the mediation system communicates a data-based communication to David. The data-based communication is a single follow-through action prompting David with "Are you available to talk with Richard at this time?" In the instance in which David is available to talk with Richard at the time specified by Richard, he confirms that he is available by depressing the control key corresponding to the accept action. In response to David confirming that he is available at the time specified by Richard, the mediation system communicates the following voice-based communication to Richard and terminates the call. "Richard, I am available to talk with you at this time. I will call you at around 15:45 hours. Thanks and I'll talk to you soon. Good-bye."

In the instance in which David is not available to talk with Richard at the time specified by Richard, he indicates that he is not available by depressing the control key corresponding to a decline action. In response to David indicating that he is not available at the time specified by Richard, the mediation system communicates the following voice-based communication to Richard and terminates the call. "Richard, I am not available to talk with you at this time. I'll follow-up with you later to try and find a convenient time to talk. Thanks for calling. Good-bye." In some instances, the mediation system may allow Richard to be transferred to David's assistant, such that mediation can be continued via David's assistant.

Figure 11:
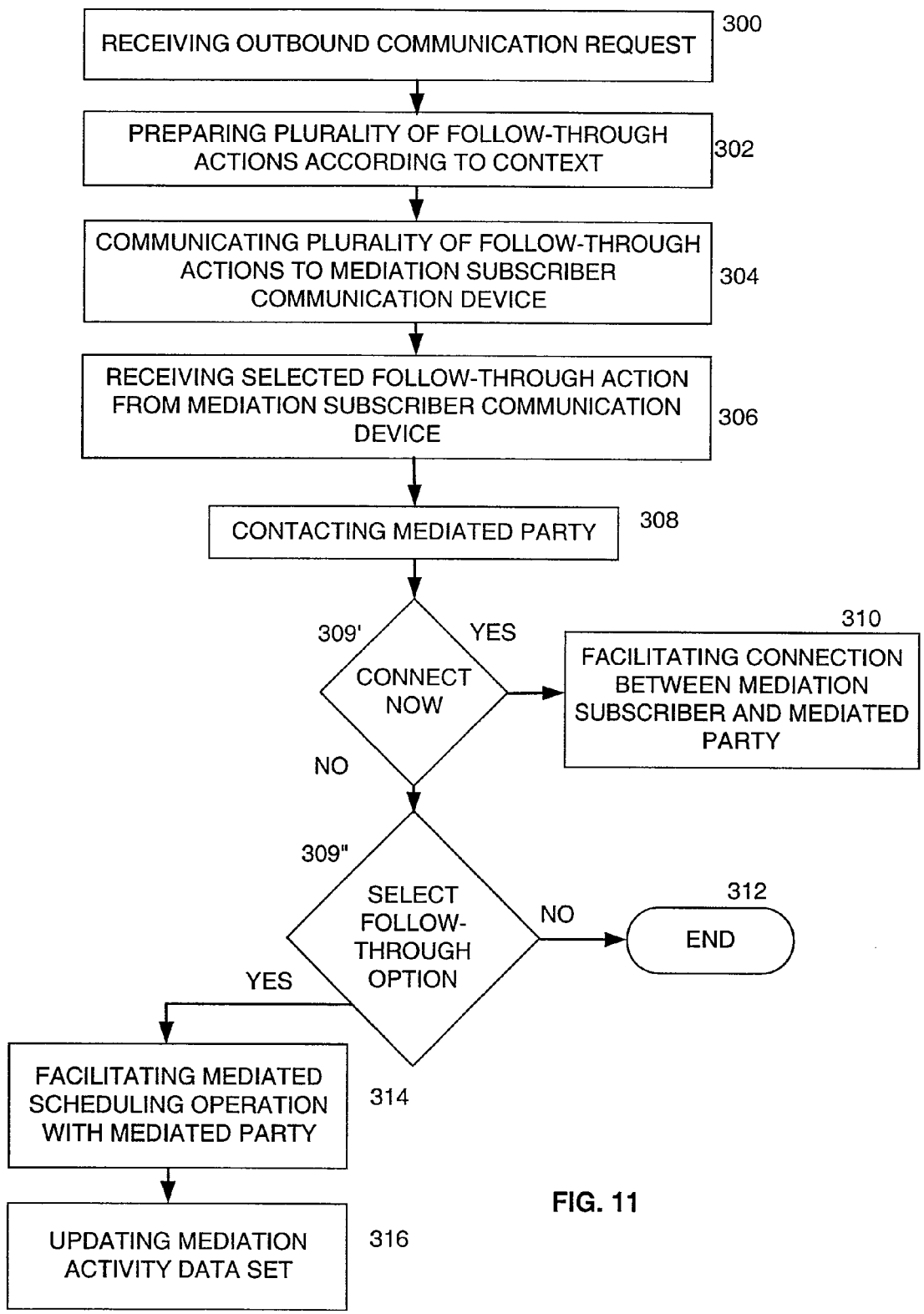
FIG. 11 is a flow chart view depicting an embodiment of a method for facilitating a mediation session initiated by an outbound communication request.

Another type of mediation session is one initiated by an outbound communication request. An embodiment of a method for facilitating a mediation session initiated by an outbound communication request is depicted in FIG. 11. The apparatus 20, as shown in FIG. 2, illustrates an example of an apparatus capable of carrying out the method depicted in FIG. 11. At a block 300, an outbound communication request is received by the mediation system 10 from the mediation subscriber communication device 16, via one or more data packets or via a voice-based communication. The outbound communication request includes contact information such as a name, a telephone number, etc. for identifying and/or contacting the mediated party 18. In response to receiving the outbound communication request, a plurality of follow-through actions is prepared at a block 302. In other embodiments, depending on the outbound request, only one follow-through action or no follow-through action is prepared. Preparing the follow-through actions includes assessing related contextual information such as the present availability of the mediation subscriber, mediation behavior and/or preferences of the mediation subscriber, information in policies of the mediation subscriber, etc.

At a block 304, the plurality of follow-through actions are communicated to the mediation subscriber from the mediation system 10. At a block 306, a selected follow-through action is received by the mediation system 10 from the mediation subscriber 12. In response to receiving the selected follow-through action, the mediated party communication device 18 is contacted at the block 308. It should be understood that the mediation system 10 contacts the mediated party communication device 18. Accordingly, the mediation system 10 engages in communication with the mediated party 14 to determine if the mediated party 14 is available to engage in communication with the mediation subscriber 12.

In response to the availability of the mediated party and the mediation subscriber permitting immediate communication (block 309'), the mediation system facilitates connection of the mediation subscriber communication device 16 with that of the mediated party communication device 18 at a block 310. In response to the availability of mediated party or the mediation subscriber not permitting communication immediately therebetween (block 309'), the mediation continues to a block 309'.

At the block 309', in response to the mediated party 14 not selecting a follow-through option, the mediation system 10 terminates its communication with the mediated party 14 at a block 312. In response to the mediated party 14 selecting a follow-through option at the block 309' the mediation system 10 facilitates, at a block 314, a mediated follow-through operation with the mediated party 14 according to the follow-through option selected at the block 309'. Scheduling time to talk, call forwarding, entering voice mail and the like are examples of follow-through options that may be selected at the block 309'. At a block 316, the mediation activity data set 35d, as shown in FIG. 7, is updated with information associated with the communication appointment.

Example 3

Outbound Call Mediation

Figure 12:
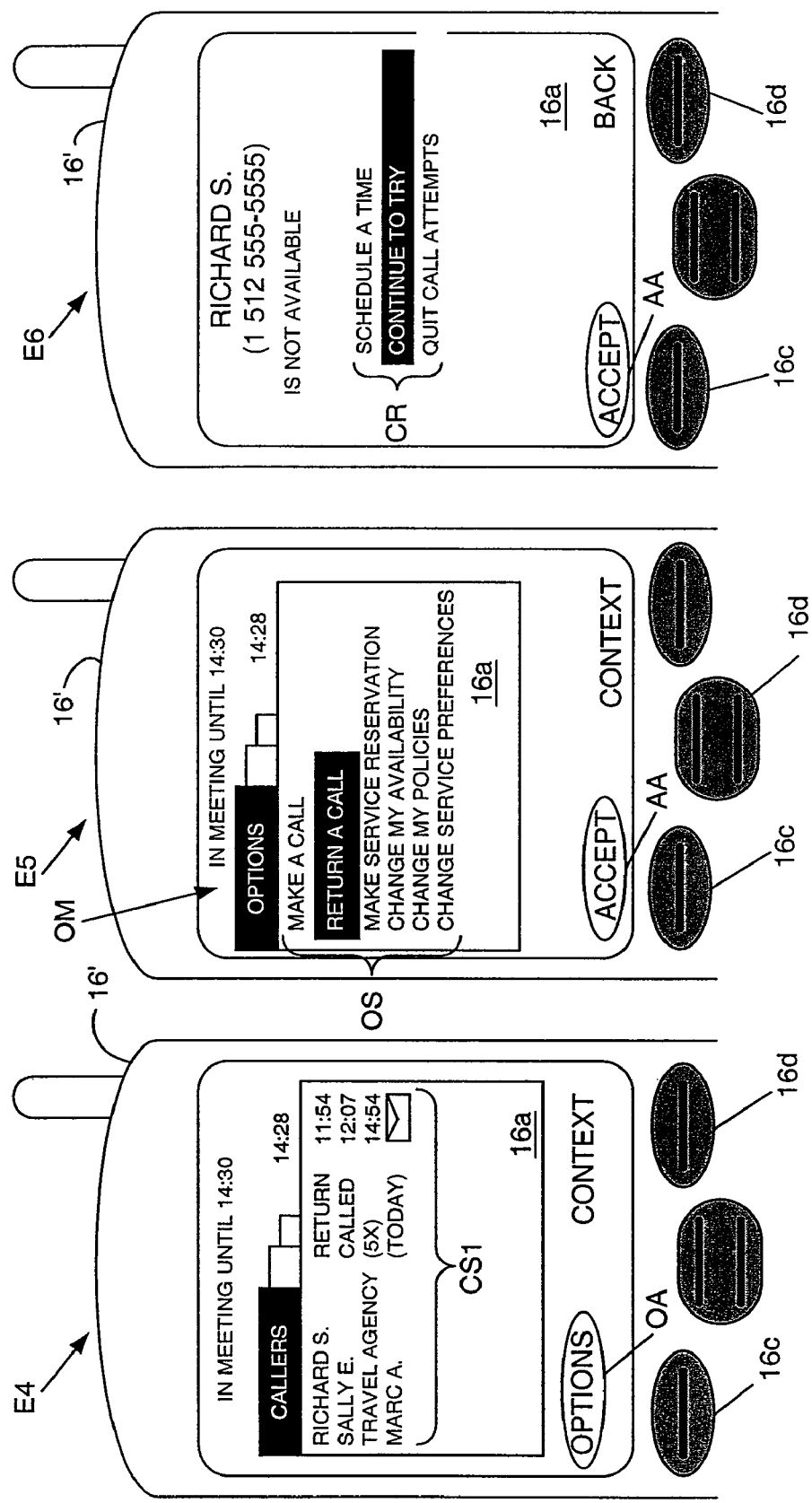
FIG. 12 is a diagrammatic view depicting an embodiment of a sequence of events associated with requesting mediation of an outbound communication using a mobile telephone.

At a fourth interaction event E4, as depicted in FIG. 12, David recognizes that his meeting is about to end. In reviewing the caller summary CS1, David decides that he would like for the mediation system to facilitate a return call to Sally E. To initiate such an operation, David depresses the control key 16c associated with an options action OA.

In response to depressing the control key 16c associated with the options action, an options menu OM is displayed on the visual display 16a at a fifth interaction event E5. The options menu OM includes a plurality of option selections OS. Examples of option selections OS include make a call, return a call, make a reservation, change my availability, change my policies and change my service preferences.

In response to choosing the 'return a call' option selection, an attempt is made at contacting Sally via her communication device. In the event that Sally answers, the mediation system connects David with Sally. In the event that Sally is not available, a plurality of call resolutions CR are displayed on the visual display at a sixth interaction event E6. The call resolutions CR provide various options when the caller is not available. Examples of call resolutions CR include schedule a call, continue to try, and quit call attempt. David uses the scroll key 16d to select the 'Continue to try' call resolution and confirms this selection by depressing the control key 16c associated with the accept action AA. The mediation continues to contact Sally.

It is desirable and advantageous for a mediated follow-through operation or pending mediated commitment to be modified according to an updated context component. For example, in the case where the availability status of the mediation subscriber changes, it is desirable and advantages for in-progress mediation operations and pending mediated commitments to be dynamically adjusted as necessary. The apparatus, methods and systems disclosed herein are capable of supporting such dynamic adjustment.

Figure 13A:
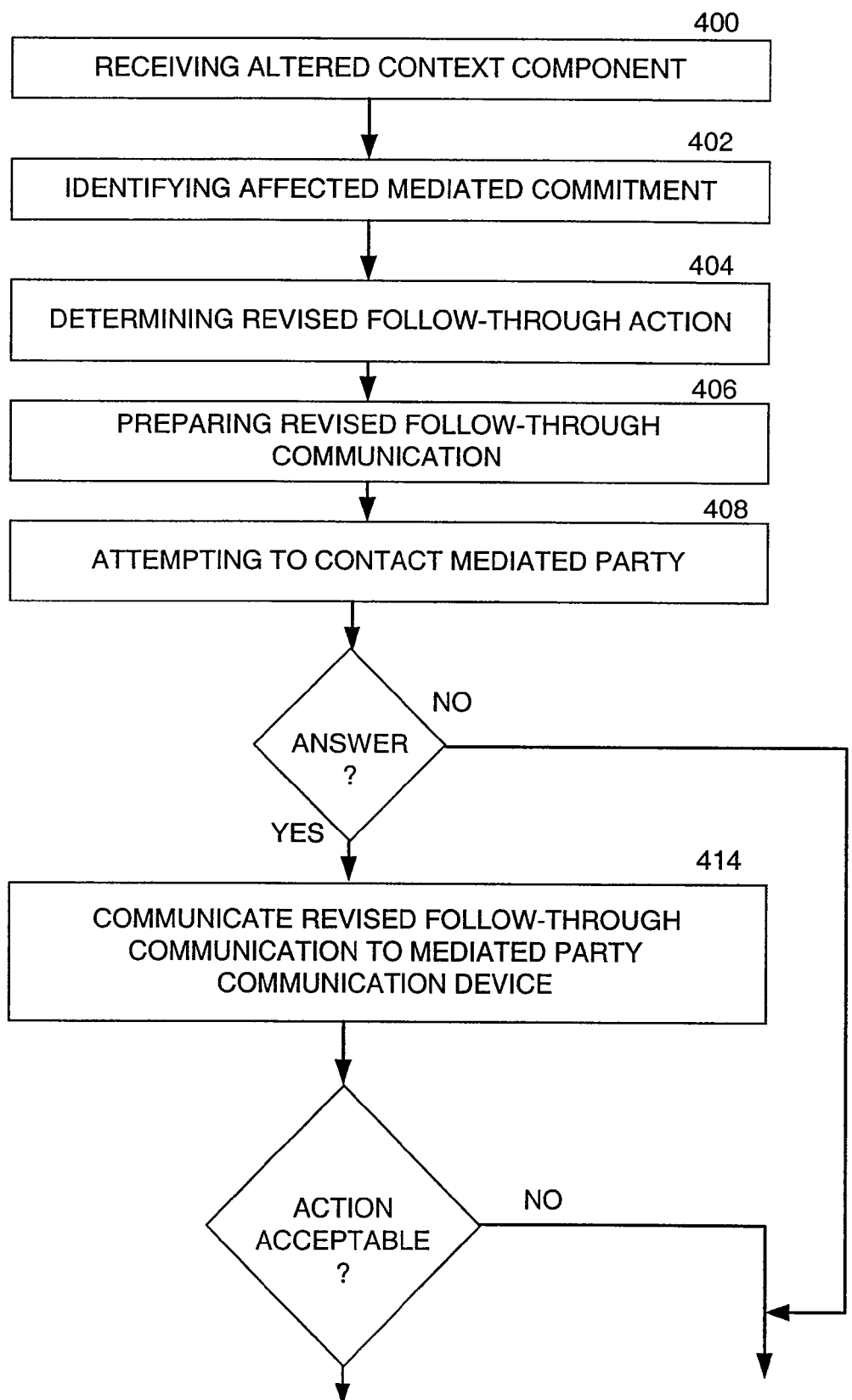
FIG. 13 is a flow chart view depicting an embodiment of a method for performing a mediated follow-through operation to alter a pending mediated commitment in response to one or more context components being altered.
Figure 13B:
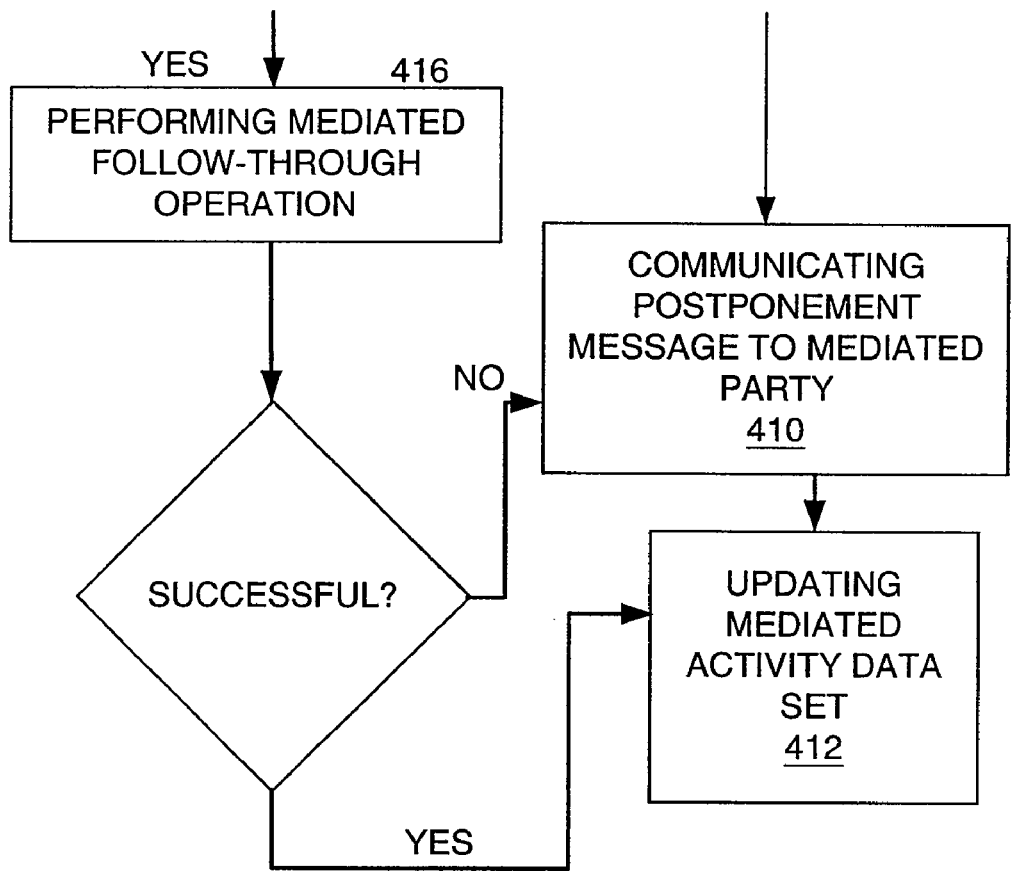

The "schedule a call" call resolution depicted in FIG. 12 is one embodiment of a call resolution for mediating a coordinated arrangement for person-to-person communication to be facilitated. In such an embodiment, the mediation system 10 mediates an agreed upon time and/or day for the mediation subscriber 12 and the mediated party 14 to communicate. FIG. 13 depicts an embodiment of a method for facilitating a mediation session to alter a pending mediated commitment in response to one or more context components being altered. The apparatus 20, as shown in FIG. 2, illustrates an example of an apparatus capable of carrying out the method depicted in FIG. 13. Information may be communicated between the mediation subscriber communication device 16 and the mediation system 10 via data packets over a suitable network.

At a block 400, an altered context component is received by the mediation system 10. The altered context component may be received from the mediation subscriber 12 or the mediated party 14. At a block, 402 an affected mediated commitment is identified. A revised availability status illustrates an example of the altered context component capable of affecting a mediated commitment. A revised follow-through action is determined and a follow-through communication is prepared at a block 404 and at a block 406, respectively. At a block 408, an attempt is made at contacting the mediated party 14 via the mediated party communication device 18.

It should be understood that one or more context components and/or mediated commitments could be affected simultaneously. Therefore, at the block 400, more than one altered context component may be received. Also, the particular revised follow-through actions included in the follow-through action summary may vary depending on the specific context components and/or mediated commitments affected.

In response to the mediated party 14 not being contacted, a postponement message is communicated to a mediated party messaging service at a block 410, if available. Voice mail and an answering machine illustrate suitable examples of the mediated party messaging service. At a block 412 the mediation activity data set 35d, as depicted in FIG. 7, is updated to reflect that the mediated commitment has been postponed.

In response to the mediated party 14 being contacted, the revised follow-through communication is communicated to the mediated party communication device 18 at a block 414. In response to the revised follow-through action being unacceptable to the mediated party 14, the method would proceed from the block 414 to the block 410, thus resulting in the mediated commitment being postponed. The method then proceeds to the block 412 where the mediation activity data set 35d, as shown in FIG. 7, is updated to reflect that the mediated commitment has been changed. In response to the revised follow-through action being acceptable to the mediated party, at a block 416, the mediated follow-through operation is performed according to the altered context component is facilitated.

In response to the mediated follow-through operation successfully producing an altered mediated commitment, the method proceeds to the block 412 where the mediation activity data set 35d, as shown in FIG. 7, is updated to reflect that the mediated commitment has been changed. In response to the mediated follow-through operation being unsuccessful at producing an altered mediated commitment, a postponement message is communicated to a mediated party 14 at a block 410. The method then proceeds to the block 412. The mediated party 14 being unable to commit to a mutually acceptable time to talk illustrates an example of the mediated follow-through operation being unsuccessful.

Example 4

Mediated Commitment Dynamic Updating

Figure 14:
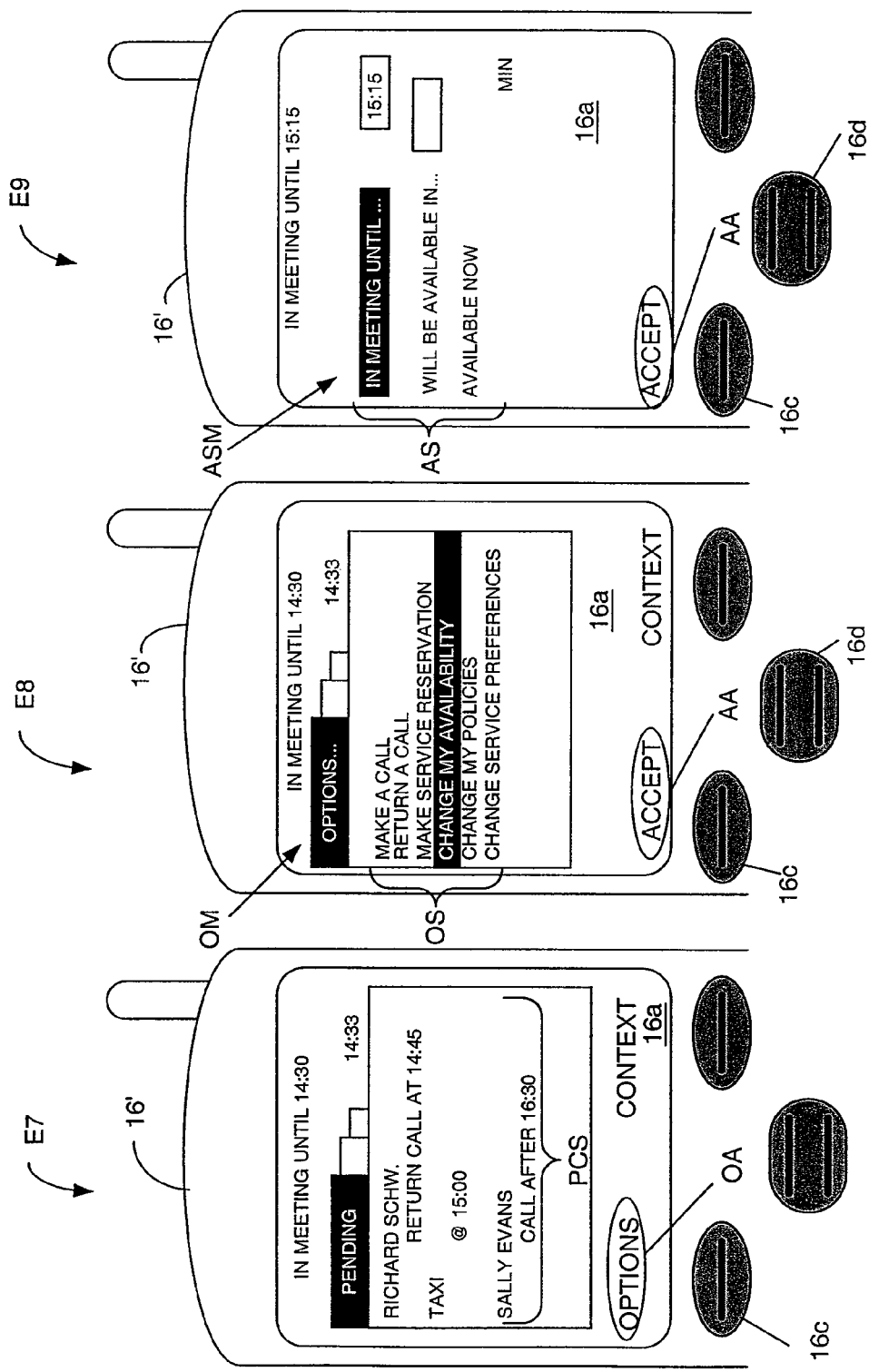
FIG. 14 is a diagrammatic view depicting an embodiment of a sequence of events for altering an availability status using a mobile telephone.

At a seventh interaction event E7, as illustrated in FIG. 14 David is still in his meeting, reviewing a pending commitment summary PCS displayed on the visual display 16a of his wireless telephone, when he notices that his meeting has run longer than expected. The pending commitment summary PCS indicates that David has a number of pending mediated commitments that are based on his meeting being over by about 14:30 hours. David also notices that the meeting has run longer than the time specified according to his availability status, as depicted in FIG. 3. Accordingly, David selects the control key associated with the options action OA such that the options menu OM is displayed at an eighth interaction event E8. David then uses the scroll key 16d to highlight the 'Change my availability' options selection and confirms the selection by depressing the control key 16c associated with the accept action AA.

In response to selecting the choosing the 'Change my availability' options selection OS, the availability status menu ASM is displayed on the visual display at a ninth interaction event E9. David uses the scroll key 16d to select the 'In meeting until . . .' availability specifier, enters a new time for when he will be out of the meeting, and confirms the new availability status by depressing the control key 16c associated with the accept action AA.

In response to altering his availability status, the mediation system identifies the pending mediated commitments associated with the availability status. The mediation system then acts on behalf of David to contact the appropriate mediated parties to revise the mediated commitments according to the altered availability status. As revised mediated commitments are established, David is able to review them via the pending commitment summary PCS.

Figure 15:
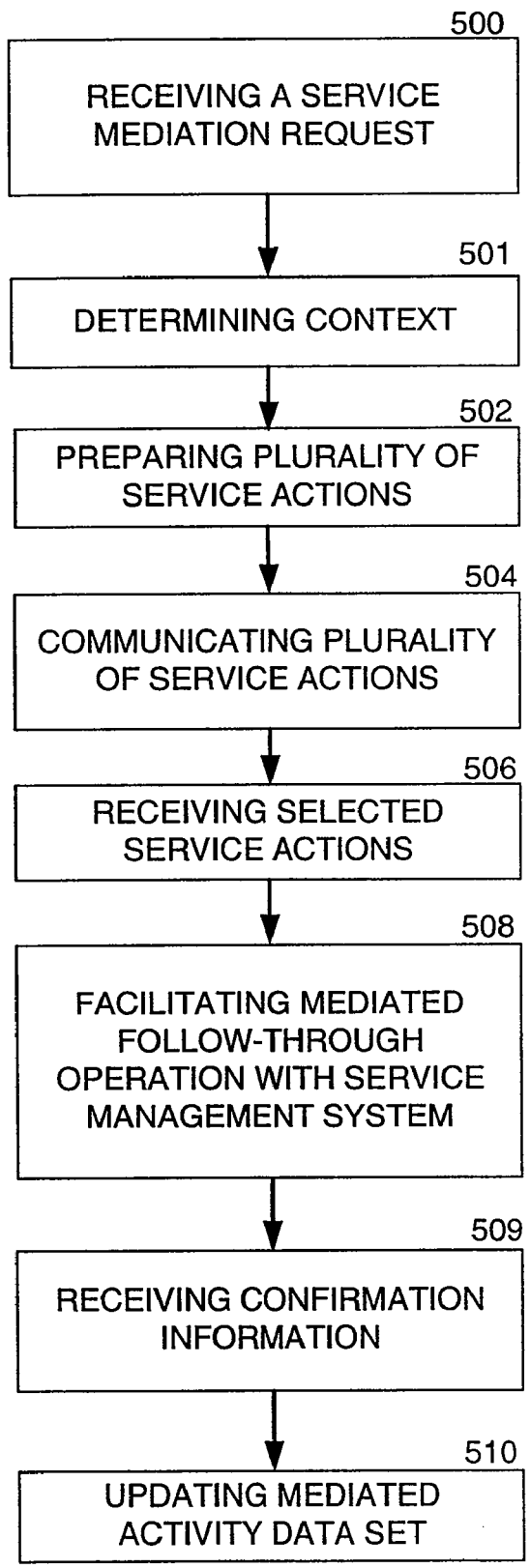
FIG. 15 is a flow chart view depicting an embodiment of a method for facilitating a mediation session for making a mediated service commitment.

FIG. 15 depicts an embodiment of a method for performing a mediation session to set-up a mediated service commitment. The apparatus 20, as shown in FIG. 2, illustrates an example of an apparatus capable of carrying out the method depicted in FIG. 15. Information may be communicated between the mediation subscriber communication device 16 and the mediation system 10 via data packets over a suitable network. At a block 500, a service mediation request is received by the mediation system 10 from the mediation subscriber communication device 16. In response to receiving the service mediation request, a context is determined and a plurality of service actions is prepared at a block 501 and a block 502, respectively. In other embodiments, one or no service actions are prepared. At a block 504, the plurality of service actions is communicated to the mediation subscriber communication device 16.

In response to receiving, at a block 506, a selected one of the service actions from the mediation subscriber communication device 16, a mediated follow-through operation is facilitated with the service provider at a block 508. At a block 509, confirmation information, such as a confirmation code, associated with the service reservation is received from the service provider reservation system.

At a block 510, in response to completing the mediated follow-through operation, the mediation activity data set 35d, as depicted in FIG. 7, is updated. Updating the mediation activity data set 35d includes adding information associated with the mediated service request, such as a confirmation number and a telephone number of the service provider, to the data set.

Figure 16:
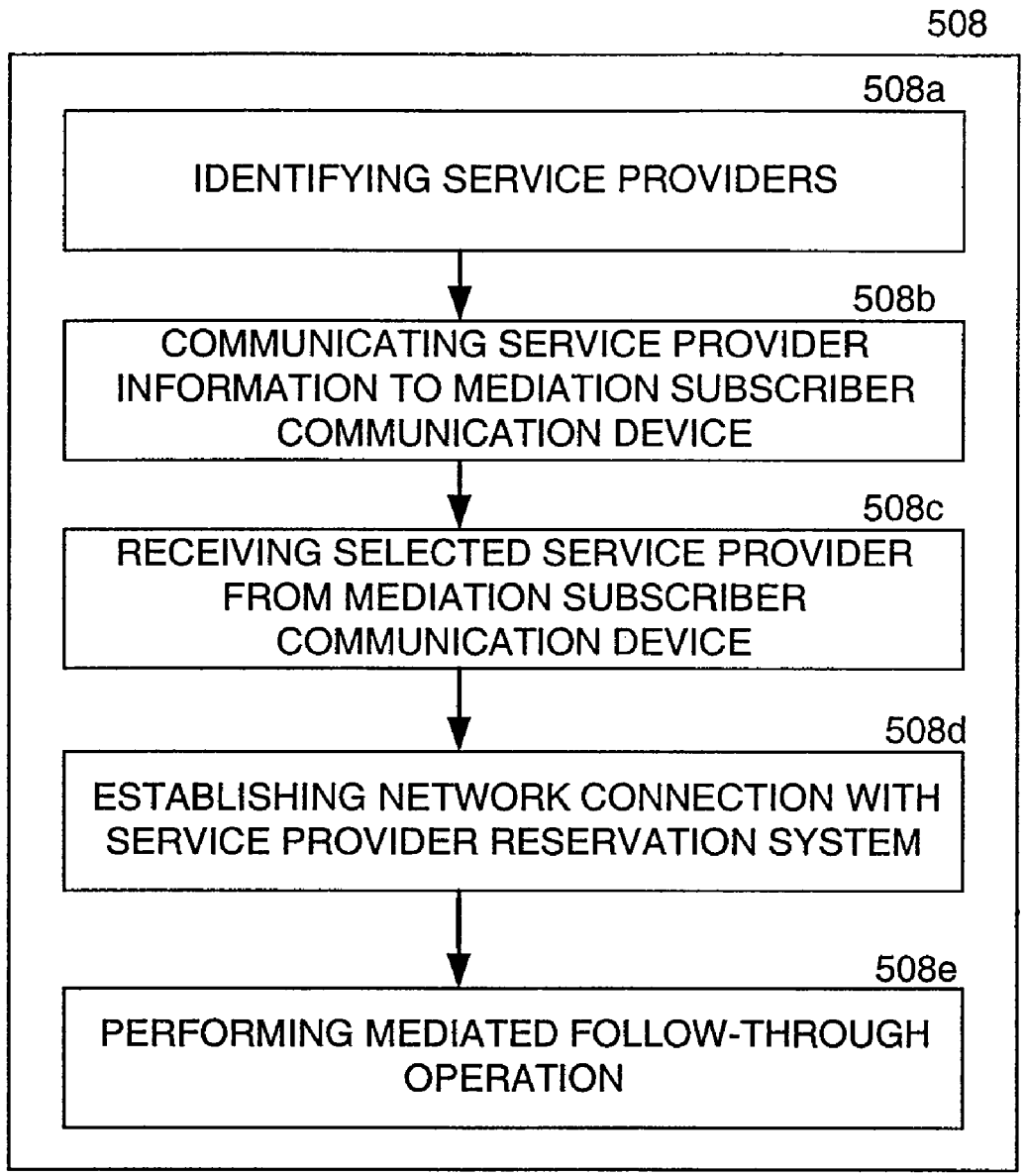
FIG. 16 is a flow chart view depicting an embodiment of a method of facilitating a mediated follow-through operation with a service management system.

FIG. 16 depicts an embodiment of a method for accomplishing the operation of facilitating the mediated follow-through operation, as depicted at a block 508 in FIG. 15. At the block 508a, a plurality of service providers capable of providing the requested service are identified. In other embodiments, only one service provider is identified. At a block 508b, the identified service providers are communicated to the mediation subscriber communication device 16. After communicating the plurality of service providers to the mediation subscriber communication device 16, confirmation of a selected service provider is received, at a block 508c, from the mediation subscriber communication device 16.

At a block 508d, a network connection is established between the service provider reservation system and the mediation system 10 through the computer network 25. At a block 508e, the mediated follow-through operation is performed, thus establishing a mediated service commitment. The mediated service commitment illustrates an example of a mediated commitment, as discussed above. It is contemplated that communication between the mediation system 10 and the service management system may be facilitated via the computer network 25 and the voice network 24.

Accordingly, data-based communication and voice-based communication may be used for facilitating the mediated service operation at the block 508e. For example, the mediation system may complete a first portion of the mediated follow-through operation via data-based communication through the computer network 25 and a second portion of the mediated follow-through operation via voice-based communication the through the voice network 24. A combined use of data-based communication and voice-based communication is defined herein to be a mixed-mode communication.

Example 5

Service Mediation

David decides to make a reservation at his favorite restaurant to be sure he gets seated for dinner without too long of a wait. He was expecting to get there before the dinner crowd. However, because his meeting ran over, he thinks he may now have a hard time getting a seat.

Figure 17:
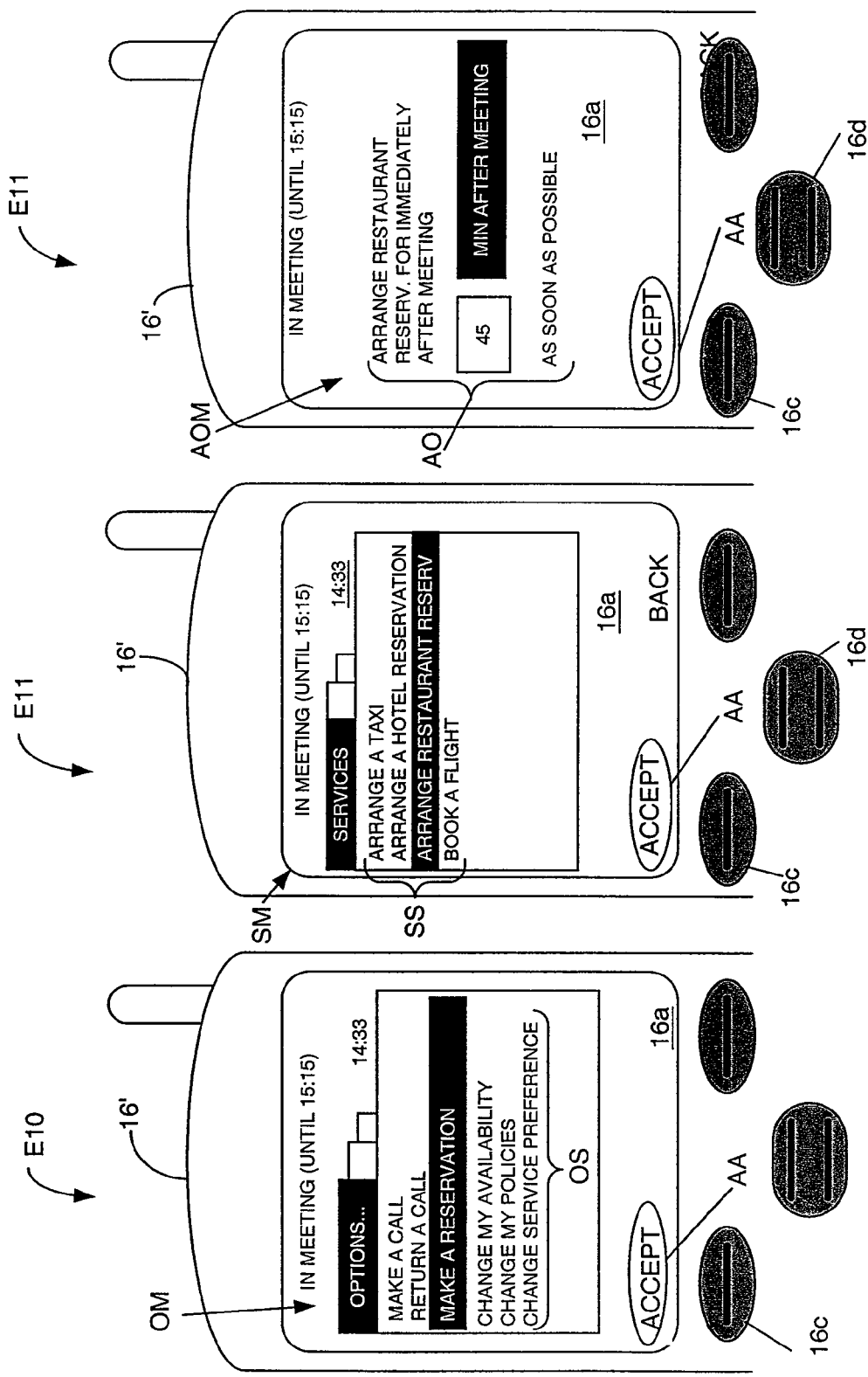
FIG. 17 is a diagrammatic view depicting an embodiment of a sequence of events for requesting a mediated service commitment using a mobile telephone.

Accordingly, at a tenth interaction event E10, as depicted in FIG. 17, David brings up the options menu OM on the visual display 16a of his wireless telephone 16'. David uses the scroll key 16d to choose the 'Make a reservation' option selection and confirms his selection by depressing the control key 16c associated with the accept action AA. In response to choosing the 'Make a reservation' option selection, a service menu is displayed on the visual display 16a at an eleventh interaction event E11. The service menu SM includes a plurality of service selections. Examples of service selections SS include arrange a taxi, arrange a hotel reservation, arrange a restaurant reservation and book a flight.

David uses the scroll key 16d to select the 'Arrange a restaurant reservation' service selection and confirms the selection by depressing the control key 16c associated with the accept action AA. In response to choosing the 'Arrange a restaurant reservation' service selection, an arrangement option menu AOM is displayed on the visual display at a twelfth interaction event E12. The arrangement option menu AOM includes a plurality of arrangement options AO.

Each service selection SS has one or more corresponding context-specific arrangement options. Accordingly, the arrangement options AO displayed in response to choosing the 'Arrange a restaurant reservation' service action are specific to arranging the taxi and are based on the present availability of the mediation subscriber. Because the mediation system knows that the mediation subscriber is in a meeting, the context derived from being in a meeting until a specified time is used to add a contextual aspect to some of the arrangement options AO. In this example, in which David is in a meeting until 15:15 hours, context-specific service actions include arranging a taxi for immediately after the meeting, arrange a taxi for X minutes after the meeting, arranging a restaurant reservation Y minutes after the meeting and booking a flight Z hours after the meeting. In this manner, a mediated service commitment may be acted on in a more specific fashion.

David uses the scroll key 16d to select the ' . . . min after meeting' arrangement option, enters 45 minutes in the corresponding time field and confirms this selection and entry by depressing the control key 16c associated with the accept action AA. In response to confirming this selection and entry, the mediation system identifies the restaurant, contacts a service management system of the restaurant and mediates the requested reservation on David's behalf according to the arrangement option specified by David. The mediation system contacts the service management system of the restaurant, such as via the Internet or via an automated or actual voice communication, for facilitating mediation of the reservation. Information associated with the restaurant are provided manually by David, garnished from the service provider preference data set in David's profile (as illustrated in FIG. 7) or a combination of such information input techniques. Once the reservation is confirmed by the mediation system, David is able to review it via the pending commitment summary PCS discussed in reference to FIG. 14.

Figure 5A:
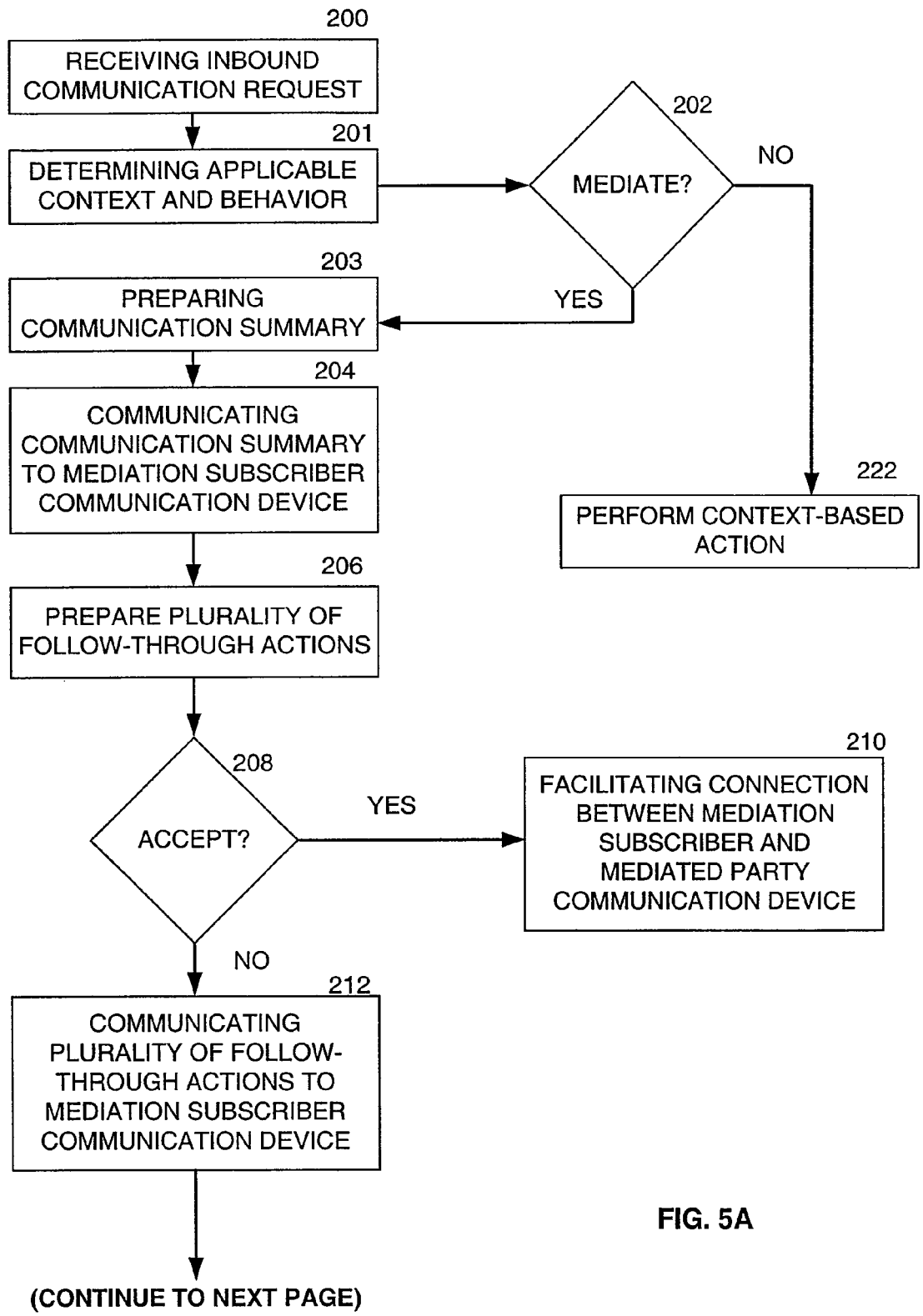
FIG. 5 is a flow chart view depicting an embodiment of a method for facilitating a mediation session initiated by an inbound communication request.
Figure 5B:
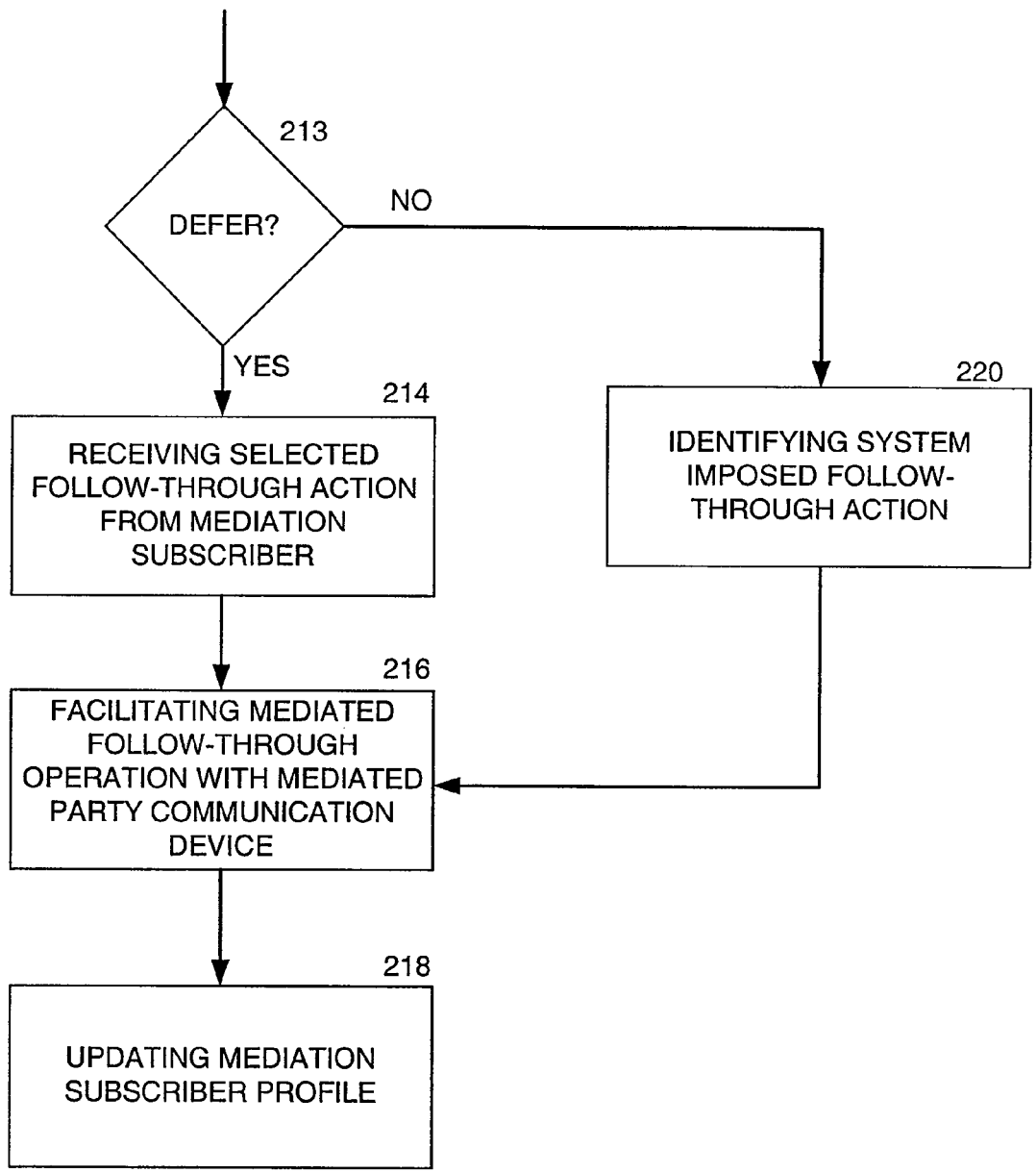
Figure 18:
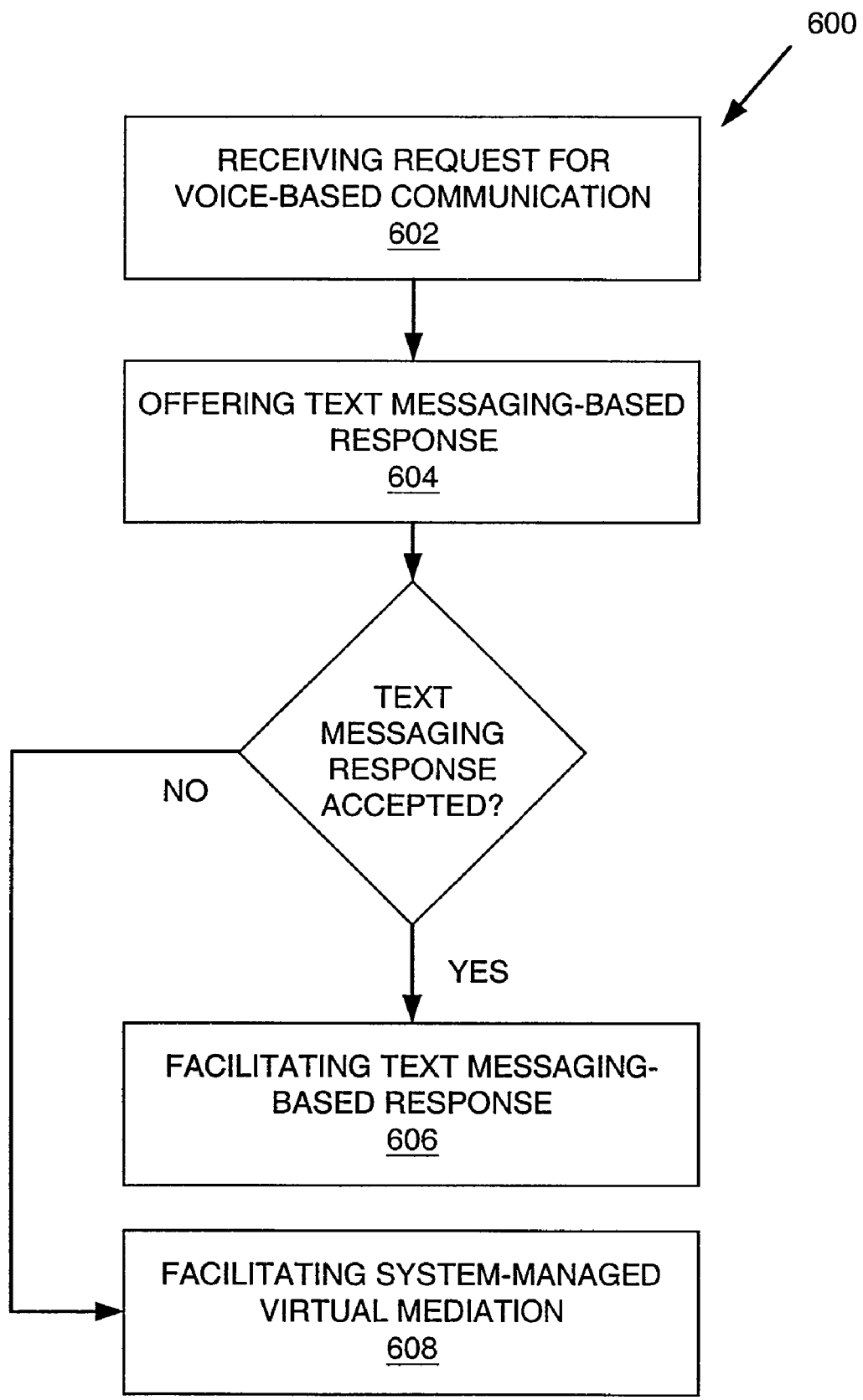
FIG. 18 is a flow chart view depicting a method for enabling response to a request for voice-based communication via text messaging in accordance with an embodiment of the disclosures made herein.

A method 600 for responding to a request for voice-based communication in accordance with an embodiment of the disclosures made herein is depicted in FIG. 18. An operation 602 is performed for receiving a request for voice-based communication from a caller communication device (i.e. a first communication device) transmitted for reception by a mediation subscriber communication device 16 (i.e. a second communication device). An inbound telephone call intended for reception by a mediation subscriber communication device 16 is an example of a request for voice-based communication. In response to receiving the request for voice-based communication, an operation 604 is performed for offering to the user of the mediation subscriber communication device 16 an option of using a text messaging based response to the user requesting voice-based communication. Communicating a text message from a subscriber for reception by a requester communication device is an example of a text messaging based response to the request for voice-based communication. In response to the offer for text messaging based response being accepted by the user of the mediation subscriber communication device 16, an operation 606 is performed indicating a text messaging based response is to be used. Facilitating the notification of text messaging is discussed in greater detail below. In response to the offer for text messaging based response not being accepted, an operation 608 is performed for facilitating system managed virtual mediation. The operations 201 through 220 depicted in FIGS. 5A and 5B are an embodiment of the operation 608 for facilitating system-managed virtual mediation.

Figure 19A:
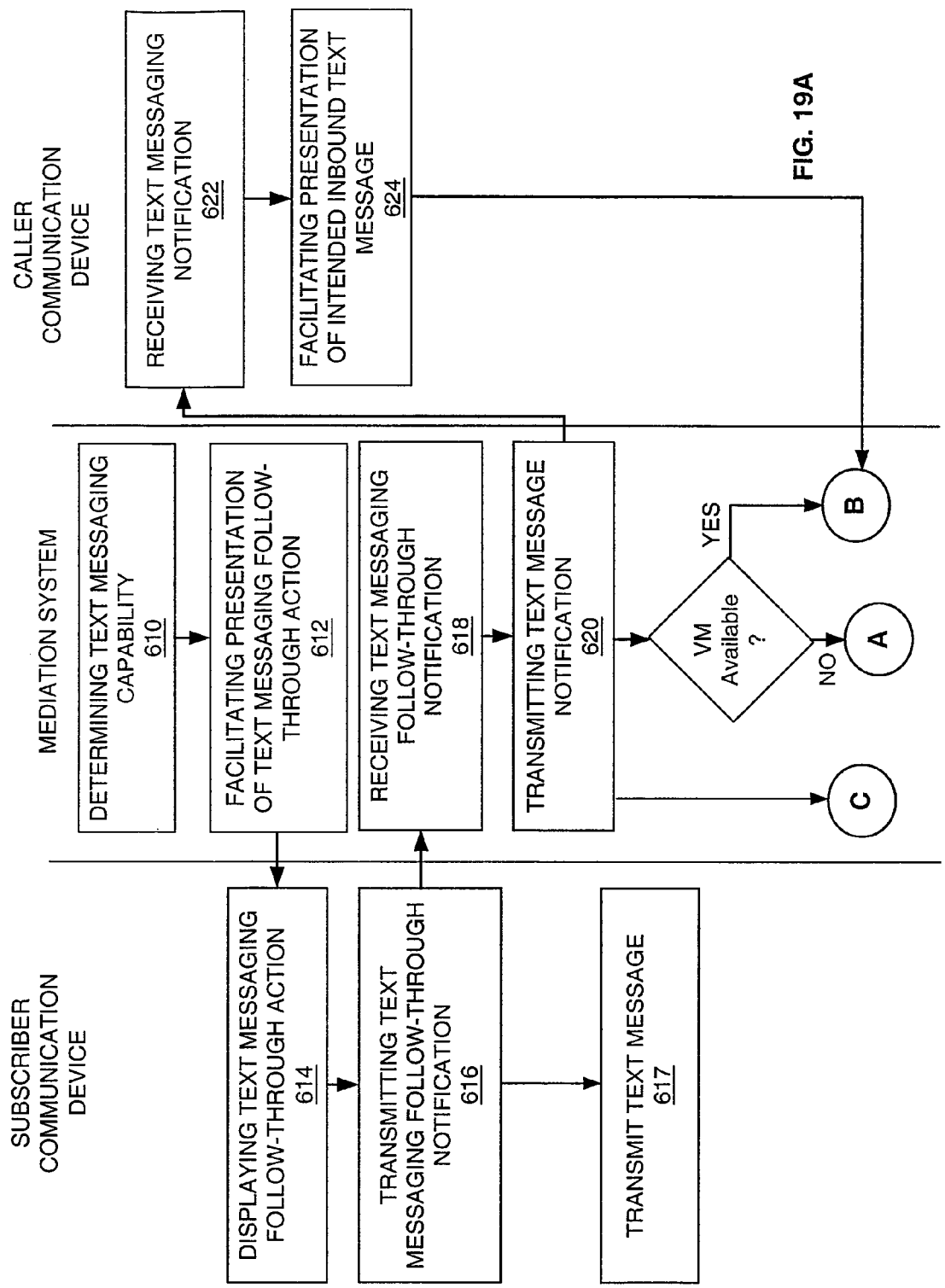
FIG. 19 is a flow chart view depicting a process for facilitating a text messaging response to a request for voice-based communication in accordance with an embodiment of the disclosures made herein.

An embodiment of a process for facilitating the notification of text messaging use is depicted in FIG. 19. At a block 610, a mediation system 10 in accordance with the disclosures made herein determines a text messaging capability of the caller communication device. One embodiment of determining a text messaging capability of the first communication device includes determining the capability of the caller communication device for communicating via a designated text messaging protocol. Short Text Messaging (SMS) protocol, Internet Address Messaging (IAM) protocol, Multi Messaging Service (MMS) protocol, Enhanced Messaging Service (EMS) protocol and an Instant Text Messaging (ITM) protocol are examples of text messaging protocols capable of supporting text messaging in accordance with embodiments of the disclosures made herein. One way of determining the capability of the first communication device for communicating via a designated text messaging protocol includes identifying at least a portion of a device identifier (e.g. a telephone number) associated with the first communication device on a list of device identifiers. For example, carriers in most countries issue limited and/or exclusive prefixes for mobile telephones. Accordingly, a database can be used that lists by prefixes, phone numbers, or other identifiers, those devices that are capable of supporting text messaging. For example, a specific service provider may be known to provide a specific type of text messaging support for all users having a specific prefix. By monitoring the prefix of the calling device it can be determined if the calling device can receive text messaging from the subscriber device. In addition, the database may support greater resolution than just prefix information, and allow specific telephone numbers to be used to reference what text messaging service, if any, is associated with the calling device based upon a specific telephone number.

After determining the text messaging capability of the caller communication device, the mediation system 10 facilitates presentation of a text messaging follow-through action on the mediation subscriber communication device 16 at a block 612 and the text messaging follow-through action is displayed on a visual display 16a of the mediation subscriber communication device 16 at a block 614. Determining the text-messaging follow-through action and transmitting the text-messaging follow-through action to the mediation subscriber communication device 16 and/or transmitting a confirmation that the caller communication device is capable of text messaging are examples of facilitating presentation of the text-messaging follow-through action. The text-messaging follow-through action enables the subscriber to initiate a notification to the calling device that a text-messaging response to the request for voice-based communication is to be used.

It is contemplated herein that the text messaging follow-through action may be one of a plurality of offered and selectable follow-through actions. For example, one embodiment of facilitating presentation of the text messaging follow-through action includes enabling transmission of at least one system defined text message follow-through action on a visual display of the second communication device. Examples of system-defined text message follow-through actions are depicted below in Table 3.

TABLE 3

| | |
|---|---|
| Urgency Text Message | For indicating a request for the caller to call back the subscriber (e.g. "If urgent call back and I will pick-up"). |
| Additional Information Request Text Message | For requesting for a response via a text message (e.g. "Text me back with more information and I'll reply via a text message"). |
| Call-Back Notification Text Message | For indicating an intent to initiate a voice-based call at a later point in time (e.g. "I'll call you back later today"). |
| Notify only of Text Message | For indicating that the user of the subscriber device will send a text message that is not one of the options. |
| Re-Direct Text Message | For offering an alternate contact number for contacting a user of the second communication device (e.g. "Call back on this number: 512-123-4567"). |

In response to the subscriber selecting the text messaging follow-through action (i.e. opting-in to a text messaging response), a text messaging follow-through notification is transmitted from the mediation subscriber communication device 16 for reception by the mediation system 10 at a block 616 and is received by the mediation system 10 at a block 618. The text messaging follow-through notification is an example of a transmission capable of informing the mediation system 10 that the text messaging follow-through action has been selected. In response to receiving the text messaging follow-through notification, the mediation system 10 transmits an audio-based text message notification for reception by the caller communication device at a block 620, which indicates a text message is to be received at the calling device. In addition to the caller communication device receiving the text message notification at a block 622, the caller communication device facilitates presentation of the text message notification at a block 624. Audibly announcing the text message notification via an audio output component of the caller communication device (i.e. a speaker) is an example of how the caller communication device facilitates presentation of the text message notification. Signaling (e.g. audible ringing) associated with the request for voice-based communication is postponed at the caller communication device during the audible announcement of the text message notification.

The text message notification includes a first portion capable of informing a caller associated with the caller communication device that a text message is intended to be transmitted to the caller communication device. The text message notification may further include a second portion capable of informing the caller of a procedure for facilitating transmission of a voice-based mail message (i.e. a voice mail message) for reception by a voice-based mail system (e.g. a voice mail system) associated with the subscriber. Instructing the caller to wait until a voice mail option is audibly offered or instructing the caller to select a particular button for immediately initiating a voice-based mail message are examples of informing the caller of a procedure for facilitating transmission of a voice-based mail message.

In an embodiment of the disclosures made herein wherein a voice mail follow-through option is not offered to the caller (e.g. voice mail functionality not available), the mediation system terminates the request for voice-based communication at a block 626 after transmitting the text message notification. Hanging up on the caller is an example of terminating the request for voice-based communication. In an embodiment of the disclosures made herein, wherein a voice mail follow-through option is offered to the caller in response to the passing of a prescribed period of waiting after the text message notification is presented, the mediation system facilitates resumed signaling (e.g. audible ringing) functionality at caller communication device at a block 628 after audible presentation of the text message notification is completed. In this manner, the mediation system 10 enables a voice-based mail message system to intercept the request for voice based communication.

Block 617 of FIG. 19 illustrates an embodiment whereby the transmission of the selected text message is performed by the mediation subscriber device 16. In this embodiment, the text message to be transmitted was determined at the time the user of the mediation subscriber communication device 16 selected the text notification option, and subsequently the mediation subscriber communication device 16 will transmit the message to the calling device. For example, the first of the first four options of Table 3 indicate the text message that is to be sent as a result of a particular option being selected. Therefore, the mediation subscriber communication device 16 can transmit the message to the calling device, once the option is selected by the user. The information needed by the mediation subscriber communication device 16 to transmit the text message to the calling device will depend upon the type of text messaging being used, but will generally comprise the phone number of the calling device. Once an option with a specific text message is selected, the mediation subscriber communication device 16 will transmit to the calling device the indicated text message. The transmission of text data will be facilitated by control data and/or software provided by the mediation system 10 to the mediation subscriber communication device 16 based upon the type of text messaging being used.

Block 629 illustrates a step used in an alternate embodiment whereby the mediation system 10, and not the mediation subscriber communication device 16, provides the text message to the calling device. Note that the last option of Table 3 indicates to the mediation system 10 that no text message is to be sent by the mediation system 10, only the predefined text message.

Figure 20:
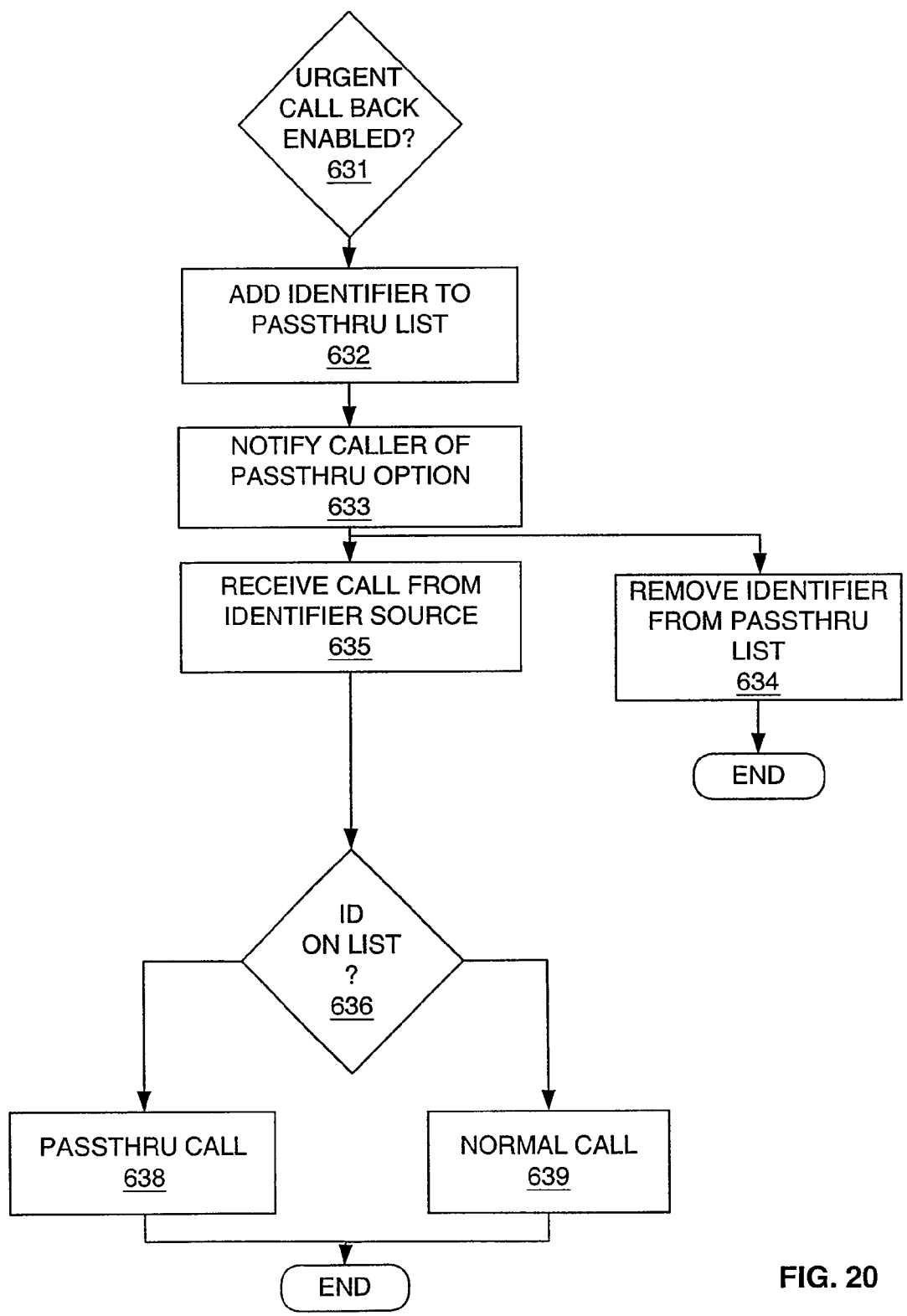
FIG. 20 is a flow chart view depicting an embodiment of a method of facilitating a call back option that can be handled in a different manner.

The first option of Table 3 anticipates that the user of the subscriber device may be willing to allow a subsequent call from the calling device to be answered, or otherwise handled differently, if it is urgent, or otherwise desired by the caller. One embodiment of such an offering is illustrated in FIG. 20, where at step 631 it is determined if the option selected at the mediation subscriber communication device 16 enables the use of such an urgent call back feature. If so, at step 632 an identifier unique to the calling device is added to a passthru list maintained by the mediation system. The passthru list may be incorporated in the mediation system 10 as a policy 35e as illustrated in FIG. 7. At step 633, the user of the calling device is notified that a call back will result in the user of the mediation subscriber communication device 16 handling the call in a different manner (e.g. answering the call). The method of FIG. 20 splits into two functional paths, the first including step 634. At step 634, the identifier added to a passthru list at step 632 is removed. Generally, the identifier will be removed from the passthru list based on the passing of some amount of time.

The second path, which is time independent of the first path includes step 635 where a call is received from the calling device. Next at step 636, the mediation system 10 checks the passthru list to determine if the calling device is to receive alternate handling (e.g. ring the mediation subscriber communication device 16 directly). If on the passthru list the call is processed by step 638 which performs the alternate handling. If not on the list, for example because a time out cased the identifier to be removed at step 634, the call is handled in a normal manner at step 639.

It will be appreciated that the call back feature described with reference to FIG. 20 can be implemented as part of the text messaging sequence, or as a stand alone feature. For example, one embodiment, of enabling the subsequent request to be accepted by the subscriber includes transmitting a text message designating instructions for submitting the subsequent request (e.g. a note to dial/redial a particular telephone number).

Embodiments of the systems, apparatus and methods disclosed herein provide advantageous and beneficial results relative to conventional mediation solutions. Such embodiments use all appropriate and available resources to interact with a mediated party. It does not depend on the mediated party being a mediation subscriber or having a smart phone. The device independent nature, with respect to the mediated party, places few restrictions on the breadth of communication. Furthermore, mediation is carried out in a very similar manner, as would mediation done personally by the mediation subscriber.

The methods disclosed herein negotiate with mediated parties with the ultimate goal of connecting the two parties. Connecting the two parties may be via a scheduled telephone call or a mediated service commitment such as a taxi reservation. The objective of the mediation system is to continually and dynamically act on the behalf of the mediation subscriber when the mediation subscriber cannot personally participate in a dynamic, personal and time-consuming manner. To this end, one aspect is the ability to identify and analyze contextual information associated with the mediation subscriber and the mediated party. Accordingly, advantageous and beneficial results are achieved as a result of separating the availability of individuals from the availability of their respective communication devices.

Some types of the mediation subscriber communications devices, such as smart phones, include data processing capabilities. For example, some smart phones are capable of running JAVA-based programs. It is contemplated that such data processing capabilities will permit at least a portion of the operations and steps of the methods disclosed herein to be performed by the mediation subscriber communication device acting as the mediation system rather than solely by a separate mediation system. For example, in some instances, it may be desirable and advantageous for all or some menu follow-through actions to be prepared by the mediation subscriber communication device 16.

The various functions and components in the present application may be implemented using an information handling machine such as a data processor, or a plurality of data processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams herein are readily implemented by one of ordinary skill in the art using one or more of the implementation techniques listed herein.

When a data processor for issuing instructions is used, the instructions may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic.

Such an information handling machine may be a system, or part of a system, such as a computer, a personal digital assistant (PDA), a hand held computing device, a cable set-top box, an Internet capable device, such as a cellular phone, and the like.

In the preceding detailed description, reference has been made to the accompanying drawings that form a part hereof, and in which are shown by way of illustration specific embodiments in which the invention may be practiced. These embodiments and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating mediated communication between users of communication devices, the method comprising:

receiving a request for voice-based communication from a first communication device of a calling party, wherein the request for voice-based communication requests commencement of a telephone call between the first communication device of the calling party and a second communication device of a called party;

in response to receiving the request for voice-based communication, automatically determining whether the first communication device of the calling party supports communication via a text messaging protocol;

in response to determining that the first communication device supports communication via the text messaging protocol, causing a response option to be displayed on a display of the second communication device of the called party, for selection by the called party, wherein the response option allows the called party to request transition from voice-based communication to text-based communication; and in response to selection by the called party of the response option requesting transition from voice-based communication to text-based communication, transmitting a text-based response to the first communication device of the calling party via the text messaging protocol.

2. The method of claim 1, wherein the operation of transmitting the text-based response to the first communication device of the calling party comprises:
transmitting the text-based response from a mediation system to the first communication device of the calling party.

3. The method of claim 1, wherein the operation of transmitting the text-based response to the first communication device of the calling party comprises:
transmitting the text-based response from the second communication device of the called party to the first communication device of the calling party.

4. The method of claim 1, wherein the operation of determining whether the first communication device supports communication via a text messaging protocol comprises:
determining whether the first communication device supports a protocol selected from the group of text messaging protocols consisting essentially of a Short Text Messaging protocol, an Internet Address Messaging protocol, a Multi Messaging Service protocol, an Enhanced Messaging Service protocol and an instant text messaging protocol.

5. The method of claim 1, wherein the operation of determining whether the first communication device supports communication via a text messaging protocol comprises:
identifying at least a portion of a device identifier associated with the first communication device on a list of device identifiers capable of communicating via the text messaging protocol.

6. The method of claim 1, further comprising:
receiving, at the mediation system, a mediation bypass notification from the second communication device; and
facilitating presentation of a mediation bypass follow-through notification at the first communication device in response to receiving the mediation by-pass notification, wherein the mediation bypass follow-through notification informs the calling party that the called party may accept a subsequent telephone call from the calling party.

7. The method of claim 6, further comprising:
facilitating a mediation bypass time-out operation for limiting a duration of time for providing mediation bypass for the calling party.

8. The method of claim 1, wherein the operation of causing a response option to be displayed on a display of the second communication device of the called party comprises:
causing the second communication device to display a list of system-defined text message follow-through options for selection by the called party.

9. The method of claim 8, wherein the operation of causing the second communication device to display a list of system-defined text message follow-through options comprises:
causing the second communication device to display an option for the called party to request a call-back from the calling party; and
causing the second communication device to display an option for the called party to request a text message response from the calling party.

10. The method of claim 9, wherein the operation of causing the second communication device to display a list of system-defined text message follow-through options further comprises:
causing the second communication device to display an option for the called party to request a specified informational response from the calling party.

11. The method of claim 9, wherein the operation of causing the second communication device to display a list of system-defined text message follow-through options further comprises:
causing the second communication device to display an option to notify the calling party that the called party intends to initiate a voice-based return call at a later point in time.

12. The method of claim 9, wherein the operation of causing the second communication device to display a list of system-defined text message follow-through options further comprises:
causing the second communication device to display an option to notify the calling party of an alternate contact number for the called party.

13. The method of claim 8, wherein the operation of causing the second communication device to display a list of system-defined text message follow-through options comprises:
displaying an option to request transmission of a pre-defined text message to the calling party.

14. A method for facilitating mediated communication between users of communication devices, the method comprising:
receiving input from a calling party at a first communication device;
in response to receiving input from the calling party at the first communication device, initiating a telephone call from the first communication device of the calling party to a second communication device of a called party;
after initiating the telephone call, receiving at the first communication device, a voice-based response from a mediation system, wherein the voice-based response notifies the calling party to expect to receive a text-based response at the first communication device;
after initiating the telephone call, receiving, at the first communication device, the text-based response; and
displaying the text-based response on a display of the first communication device for the calling party.

15. The method of claim 14, wherein the operation of receiving a voice-based response from a mediation system, at the first communication device of the calling party, further comprises:
receiving notification at the first communication device of the calling party of a procedure for leaving a voice-based mail message for the called party.

16. The method of claim 15, wherein the operation of receiving a voice-based message from a mediation system, at the first communication device of the calling party, further comprises:

receiving a mediation notification at the first communication device, wherein the mediation bypass notification informs the calling party that the called party may accept a subsequent telephone call from the calling party.

17. A method for facilitating mediated communication between users of communication devices, the method comprising:

receiving a request for voice-based communication from a first communication device of a calling party, wherein the request for voice-based communication requests commencement of a telephone call between the first communication device of the calling party and a second communication device of a called party in conjunction with receiving the request for voice-based communication from the first communication device of the calling party, displaying a text messaging follow-through option on a visual display of the second communication device, wherein the text messaging follow-through option allows the called party to request transition from voice-based communication to text-based communication; and in response to selection by the called party of the text messaging follow-through option requesting transition from voice-based communication to text-based communication, automatically causing a text-based response to be transmitted to the first communication device of the calling party.

18. The method of claim 17, wherein the operation of displaying a text messaging follow-through option on a visual display of the second communication device comprises:

displaying a mediation bypass follow-through option on the visual display of the second communication device, for selection by the called party to inform the calling party that the called party may accept a subsequent telephone call from the calling party.

19. The method of claim 18, further comprising:

facilitating a mediation bypass time-out operation for limiting a duration of time for providing mediation bypass for the calling party.

\* \* \* \* \*